United States Patent
Cho et al.

(10) Patent No.: US 9,047,711 B2
(45) Date of Patent: Jun. 2, 2015

(54) MOBILE TERMINAL AND 3D IMAGE CONTROL METHOD THEREOF

(71) Applicant: LG ELECTRONICS INC., Seoul (KR)

(72) Inventors: Youngil Cho, Gyeonggi-Do (KR); Dongsung Kim, Ulsan (KR)

(73) Assignee: LG ELECTRONICS INC., Seoul (KR)

( * ) Notice: Subject to any disclaimer, the term of this patent is extended or adjusted under 35 U.S.C. 154(b) by 324 days.

(21) Appl. No.: 13/706,316

(22) Filed: Dec. 5, 2012

(65) Prior Publication Data

US 2013/0141435 A1  Jun. 6, 2013

(30) Foreign Application Priority Data

Dec. 5, 2011  (KR) .................. 10-2011-0129183
Dec. 6, 2011  (KR) .................. 10-2011-0129775

(51) Int. Cl.
| | | |
|---|---|---|
| G06T 15/50 | (2011.01) | |
| H04N 13/00 | (2006.01) | |
| H04N 13/02 | (2006.01) | |
| H04N 13/04 | (2006.01) | |

(52) U.S. Cl.
CPC ............ *G06T 15/50* (2013.01); *H04N 13/0022* (2013.01); *H04N 13/026* (2013.01); *H04N 13/0292* (2013.01); *H04N 13/0402* (2013.01)

(58) Field of Classification Search
None
See application file for complete search history.

(56) References Cited

U.S. PATENT DOCUMENTS

| | | |
|---|---|---|
| 2009/0167757 A1 | 7/2009 | Jang et al. |
| 2009/0195643 A1 | 8/2009 | Neuman |
| 2009/0233649 A1 | 9/2009 | Burstrom |
| 2010/0251293 A1* | 9/2010 | Riggert et al. ............ 725/37 |
| 2010/0302237 A1 | 12/2010 | Aramaki |
| 2012/0113099 A1* | 5/2012 | Kim et al. ................ 345/419 |

FOREIGN PATENT DOCUMENTS

| | | |
|---|---|---|
| EP | 2268045 | 12/2010 |
| EP | 2312375 | 4/2011 |

OTHER PUBLICATIONS

European Patent Office Application Serial No. 12008111.2, Search Report dated Aug. 8, 2014, 18 pages.
European Patent Office Application Serial No. 12008111.2, Search Report dated Jun. 4, 2012, 8 pages.

* cited by examiner

*Primary Examiner* — Phi Hoang
*Assistant Examiner* — Mohammad H Akhavannik
(74) *Attorney, Agent, or Firm* — Lee, Hong, Degerman, Kang & Waimey

(57) ABSTRACT

According to one embodiment, a method for controlling display of an image in a mobile terminal includes: displaying a two-dimensional (2D) image including a plurality of objects; converting the 2D image to a three-dimensional (3D) image including the plurality of objects in response to a touch input; measuring an ambient brightness; and automatically adjusting a screen brightness and a depth of the 3D image using control values corresponding to the measured ambient brightness.

21 Claims, 24 Drawing Sheets

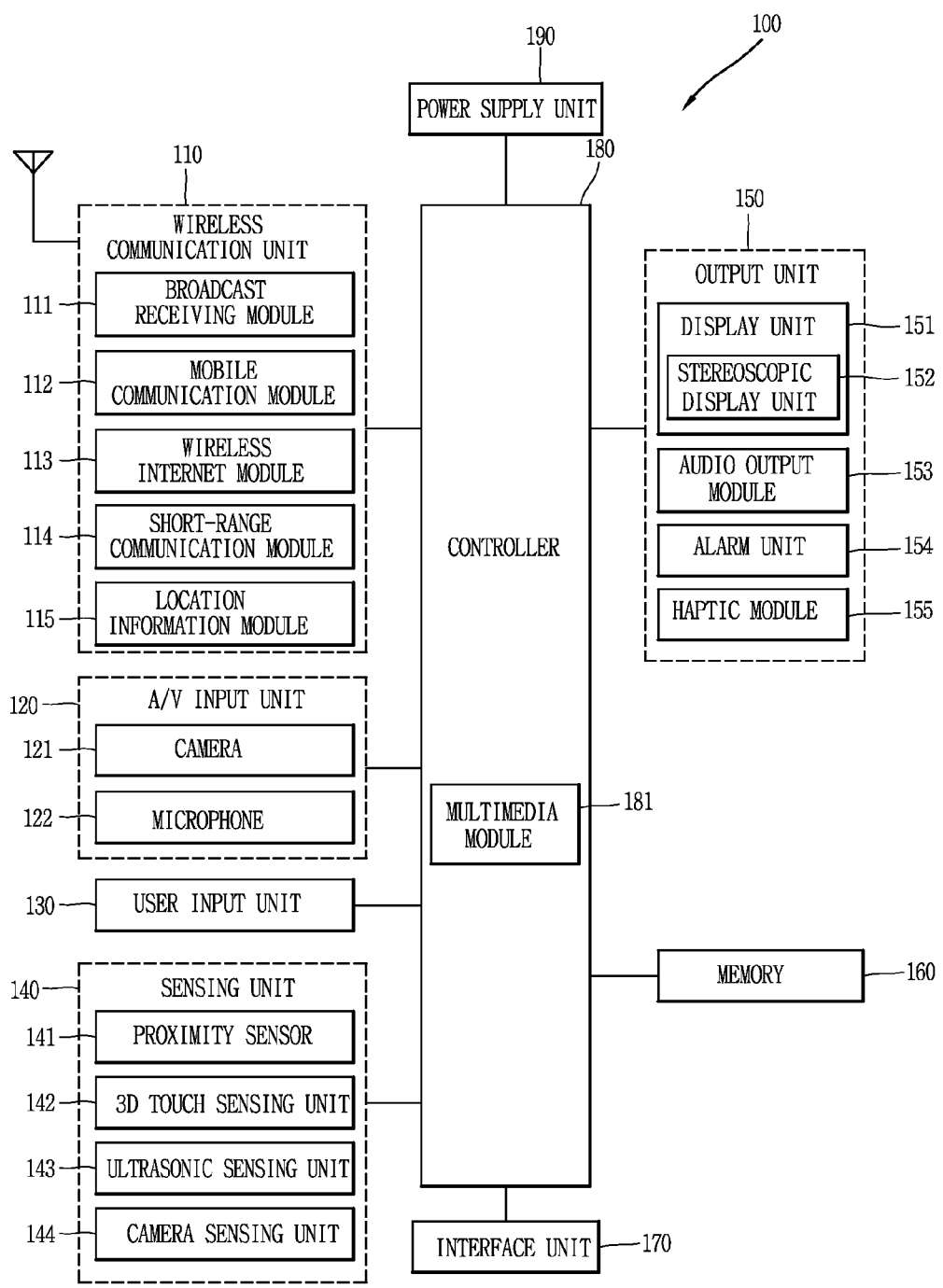

FIG. 4
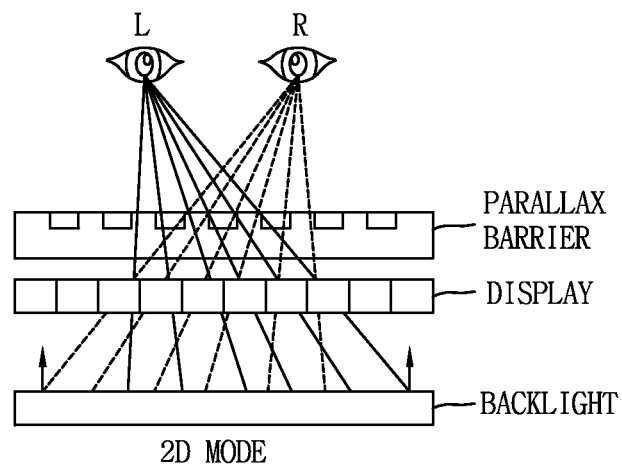
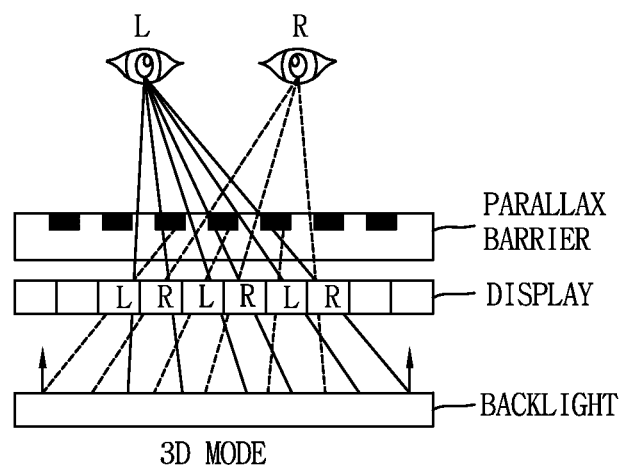

FIG. 5
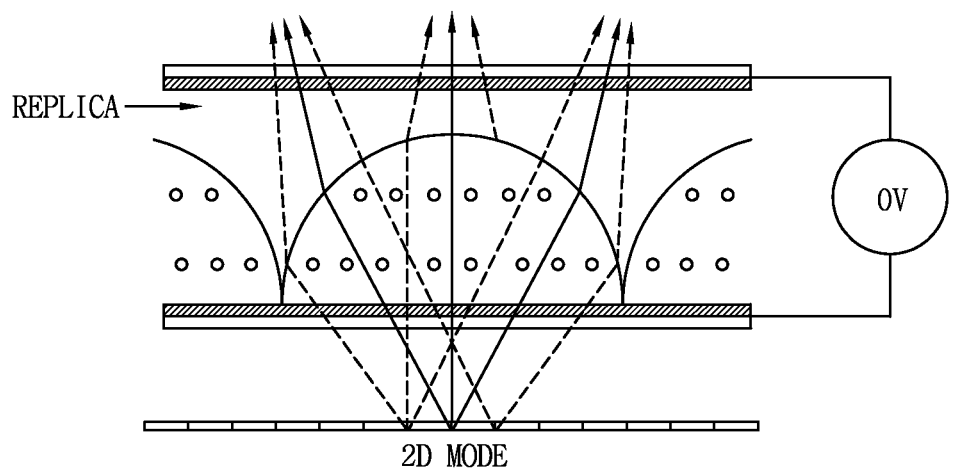
2D MODE
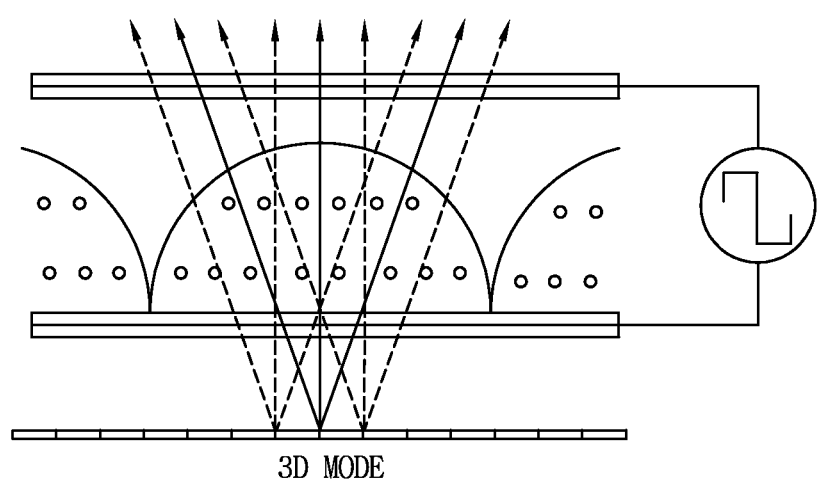
3D MODE

FIG. 10B
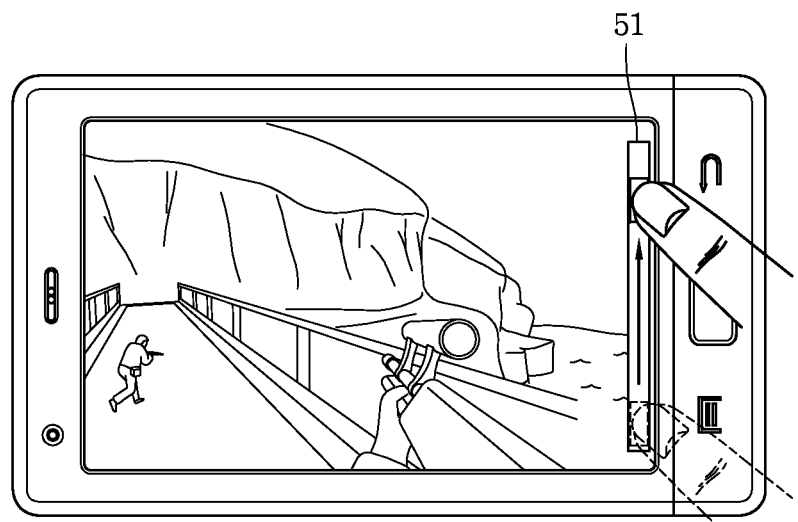
AUTOMATICALLY ADJUST SCREEN BRIGHTNESS BY
SCROLLING 3D BAR
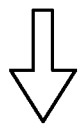
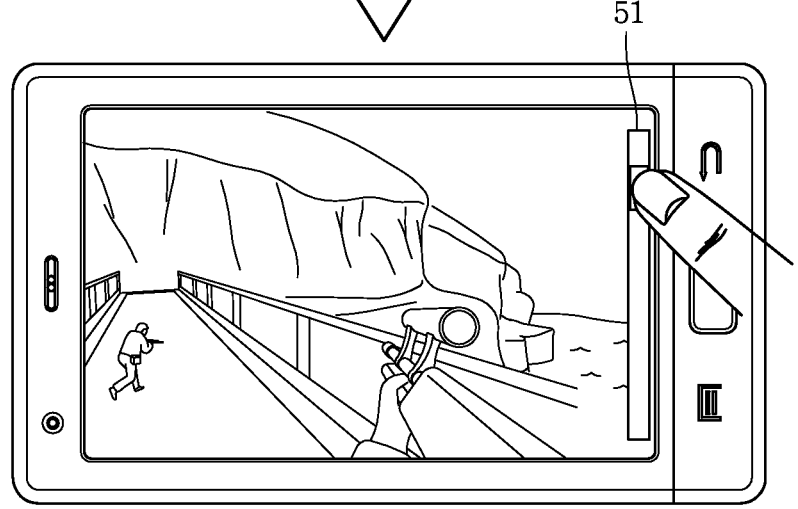
FURTHER ADJUST SCREEN BRIGHTNESS BY
TOUCHING 3D BAR AFTER COMPLETE SCROLLING

MOBILE TERMINAL AND 3D IMAGE CONTROL METHOD THEREOF

CROSS-REFERENCE TO RELATED APPLICATIONS

Pursuant to 35 U.S.C. §119(a), this application claims the benefit of earlier filing date and right of priority to Korean Application No. 10-2011-0129183, filed on Dec. 5, 2011, and Korean Application No. 10-2011-0129775, filed on Dec. 6, 2011, the contents of all of which are incorporated by reference herein in their entireties.

TECHNICAL FIELD

Embodiments of the invention relate to a mobile terminal capable of adjusting a Three-Dimensional (3D) image and a characteristic of a 3D object according to ambient brightness, and a method of adjusting a Three-Dimensional (3D) image and a characteristic of a 3D object according to ambient brightness.

BACKGROUND

Mobile terminals (or electronic devices) may be configured to perform various functions, for example, data and voice communication, capturing images or video, storing voice, reproducing music files via a speaker system, displaying images or video and the like. Some mobile terminals may include an additional function of playing games, and other mobile terminals may be implemented as multimedia players. In addition, recent mobile terminals can receive broadcast or multicast signals to allow viewing of video or television programs.

Furthermore, many efforts are underway to support or enhance various functions of such mobile terminals. Such efforts include not only changes and improvement of structural components for implementing a mobile terminal but also software or hardware improvement.

Among other functions, a touch function of the mobile terminal is designed to aid a user who is unfamiliar with button/key input using a touch screen to conveniently execute operations of the mobile terminal. Recently, the touch function is becoming an important function of the terminal together with a user interface (UI), in addition to a simple input function. Hence, as the touch function is further implemented in the mobile terminal in various forms, development of appropriate UIs is needed to a larger extent.

Recently, mobile terminals are evolving to display Three-Dimensional (3D) images allowing for depth perception and stereovision beyond levels corresponding to display of Two-Dimensional (2D) images, and related products are being released. This allows users to experience more realistic 3D stereoscopic images using a mobile terminal having a 3D imaging function, and to use various user interfaces or contents related to the 3D stereoscopic images.

When a user watches a 3D image using a mobile terminal, a depth of the image is fixed to a default value. This causes limitations on expressing the sense of dimension (stereoscopic effect) for each object of the image. Accordingly, the user has to watch the 3D image with the same depth irrespective of the surrounding environment, including, in particular, ambient brightness (quantity of light). However, the depth that the user senses may depend on ambient brightness and screen brightness even if the image has a fixed depth. When such a situation continues for a long (or extended) period of time, the user may experience considerable fatigue.

The related art has not provided satisfactory user interfaces (UIs) for adjusting the depth of a 3D image in order to reduce eye strain under such situations.

SUMMARY

According to one aspect or embodiment, a mobile terminal is capable of improving visibility of a Three-Dimensional (3D) image and convenience of viewing by adjusting screen brightness and a sense of depth according to ambient brightness. A corresponding method of adjusting depth of an image displayed by the mobile terminal is also disclosed.

According to another aspect or embodiment, a mobile terminal is capable of automatically adjusting attribute information (for example, color, luminance and saturation) relating to objects upon 3D conversion. A corresponding method of adjusting depth of an image displayed by the mobile terminal is also disclosed.

In accordance with one or more aspects or embodiments, a method for controlling display of a Three-Dimensional (3D) image in a mobile terminal includes: displaying a Two-Dimensional (2D) image including a plurality of objects; converting the 2D image to a 3D image in response to a touch input; measuring ambient brightness; and automatically adjusting screen brightness and depth of the 3D image using control values corresponding to the measured ambient brightness.

The 3D image may be an image displayed in a full 3D mode or a partial 3D mode, and the ambient brightness may be measured by an optical sensor.

The control values may be stored in an information table of a memory in which the control values are mapped to ambient brightness. Here, the control values may include values with respect to screen brightness and depth of an entire 3D image in the full 3D mode, and values with respect to screen brightness, depth and brightness of a selected 3D object and background brightness in the partial 3D mode.

In accordance with one embodiment, automatically adjusting screen brightness and depth of the 3D image may include searching a pre-stored information table for a brightness value and a depth value mapped to the measured ambient brightness, and adjusting the screen brightness and the depth of the 3D image based on the searched (or located) brightness value and depth to value.

In accordance with one embodiment, automatically adjusting screen brightness and depth of the 3D image may include: checking whether or not the measured ambient brightness belongs to an average value range when the full 3D mode is in operation; adjusting only the depth of the 3D image based on the control values when the measured ambient brightness belongs to the average value range; and adjusting both the screen brightness and the depth of the 3D image based on the control values corresponding to the ambient brightness when the measured ambient brightness is outside of the average value range.

In accordance with one embodiment, automatically adjusting screen brightness and depth of the 3D image may include: comparing the measured ambient brightness, depth of each object and screen brightness with preset reference values when the partial 3D mode is in operation; adjusting brightness of the object and brightness of a background based on the measured ambient brightness when the depth of each object is uniform according to a result of the comparison; adjusting brightness and depth of each object and brightness of the background based on the measured ambient brightness when the measured ambient brightness belongs to the average value range; and adjusting depth of the object and brightness of the background based on the measured ambient brightness when the screen brightness is uniform.

A method for controlling display of a 3D image in the mobile terminal may further include displaying a depth-adjusted level of the 3D image on one side of a screen by use of a 3D adjustment indicator, and further adjusting the depth of the 3D image in response to a user input received via the displayed 3D adjustment indicator.

When the depth of the 3D image is adjusted by the 3D adjustment indicator, the screen brightness may be set automatically or in response to a user input (e.g., a touch count, moving) applied via the 3D adjustment indicator.

The method for controlling display of the 3D image in the mobile terminal may further include changing a characteristic of each object based on a 3D depth value of each object included in the converted 3D image, and displaying the 3D image including the characteristic-changed objects.

The characteristic of each object may include attribute information relating to at least a shape, a size or a color of each object, and the attribute information relating to the color may include at least color, luminance or saturation.

In accordance with a further embodiment, the changing of the characteristic of each object may include calculating an average 3D depth value of the objects using a 3D depth value of each object, and changing the characteristic of each object based on a difference between the 3D depth value of each object and the calculated average 3D depth value.

According to one embodiment, the method for controlling display of the 3D image in the mobile terminal may further include dividing a specific object into a plurality of regions based on attribute information relating to colors included in the corresponding object when a touch input applied to the specific object is sensed, and changing a 3D depth value of each region based on the attribute information relating to the colors of each divided region.

According to one embodiment, the method for controlling display of the 3D image in the mobile terminal may further include detecting a level of a touch applied to a specific object when a touch input applied to the specific object is sensed, and changing a 3D depth value of the specific object according to the detected level.

The level of the touch may include a touch holding time, a touch count and a dragged length, and indicate a distance between two touch points when multiple touch inputs are sensed.

In accordance with one or more aspects or embodiments, a mobile terminal includes: a display unit configured to display a 2D image including a plurality of images; a memory configured to store control values, the control values being set to correspond to a characteristic of each object and ambient brightness; a sensing unit configured to sense the ambient brightness or a touch input; and a controller configured to convert the 2D image into a 3D image in response to a touch input, and search the memory for control values, which correspond to the ambient brightness sensed by the sensing unit, in order to automatically adjust screen brightness and depth of the 3D image.

The control values may be stored in an information table of the memory in which the control values are mapped to ambient brightness. Here, the control values may include values with respect to screen brightness and depth of an entire 3D image in a full 3D mode, and values with respect to screen brightness, depth and brightness of a selected 3D object and brightness of a background in a partial 3D mode.

The controller may check whether or not the sensed ambient brightness belongs to an average value range when a full 3D mode is in operation, adjust only the depth of the 3D image when the sensed ambient brightness belongs to the average value range, and adjust both the screen brightness and the depth of the 3D image based on the control values corresponding to the sensed ambient brightness when the sensed ambient brightness is outside of the average value range.

The controller may execute operations of comparing the sensed ambient brightness, depth of each object and screen brightness with preset reference values when a partial 3D mode is in operation, adjusting brightness of the object and brightness of a background based on the sensed ambient brightness when the depth of each object is uniform according to a result of the comparison, adjusting brightness and depth of each object and brightness of the background based on the sensed ambient brightness when the sensed ambient brightness belongs to an average value range, and adjusting the depth of the object and the brightness of the background based on the sensed ambient brightness when the screen brightness is uniform.

The controller may display a depth-adjusted level on one side of a screen using a 3D adjustment indicator when the ambient brightness and the depth are automatically adjusted, and further adjust the depth of the 3D image in response to a user input received via the 3D adjustment indicator.

The controller may set optimal screen brightness automatically or set the depth of the 3D image and the screen brightness according to a moving distance, a moving direction and a touch count of the 3D adjustment indicator when the depth of the 3D image is adjusted by use of the 3D adjustment indicator.

In accordance with one embodiment, the controller may change a characteristic of each object based on a 3D depth value of each object included in the converted 3D image, and display the 3D image including the characteristic-changed objects on the display unit.

The controller may calculate an average 3D depth value based on a 3D depth value of each object, and change the characteristic of each object based on a difference between the 3D depth value of each object and the calculated average depth value.

The characteristic of each object may include attribute information relating to at least a shape, a size and a color of each object, and the attribute information relating to the color may include at least color, luminance or saturation.

The controller may divide each object into a plurality of regions based on the attribute information relating to the colors included in each object, and change a 3D depth value of each region based on attribute information relating to colors of each of the plurality of regions.

The controller may change a 3D depth value of a specific object based on a level of a touch applied on the specific object when a touch input applied to the specific object is sensed.

The level of the touch may include a touch holding time, a touch count and a dragged length, and indicate a distance between two touch points when multiple touch inputs are sensed.

Further applications of features of embodiments of the present invention will become more apparent from the detailed description provided herein. However, it should be understood that the detailed description and specific examples, while illustrating various embodiments of the invention, are provided by way of illustration only. Various changes and modifications that are within the spirit and scope of the invention will become apparent to those skilled in the art based on the detailed description.

BRIEF DESCRIPTION OF THE DRAWINGS

The accompanying drawings, which are included to provide a further understanding of disclosed features and are incorporated in and constitute a part of this specification, illustrate various embodiments and together with the description serve to explain principles of embodiments of the invention.

In the drawings:

FIG. 1 is a block diagram of a mobile terminal in accordance with a first embodiment;

FIG. 4 illustrates a moving (switchable) parallax barrier type 3D mode;

FIG. 5 illustrates an active lenticular lens type 3D mode;

FIGS. 10A and 10B illustrate an adjustable user interface (UI) for allowing a user to adjust the depth of a 3D image according to various embodiments;

DETAILED DESCRIPTION

Figure 2A:
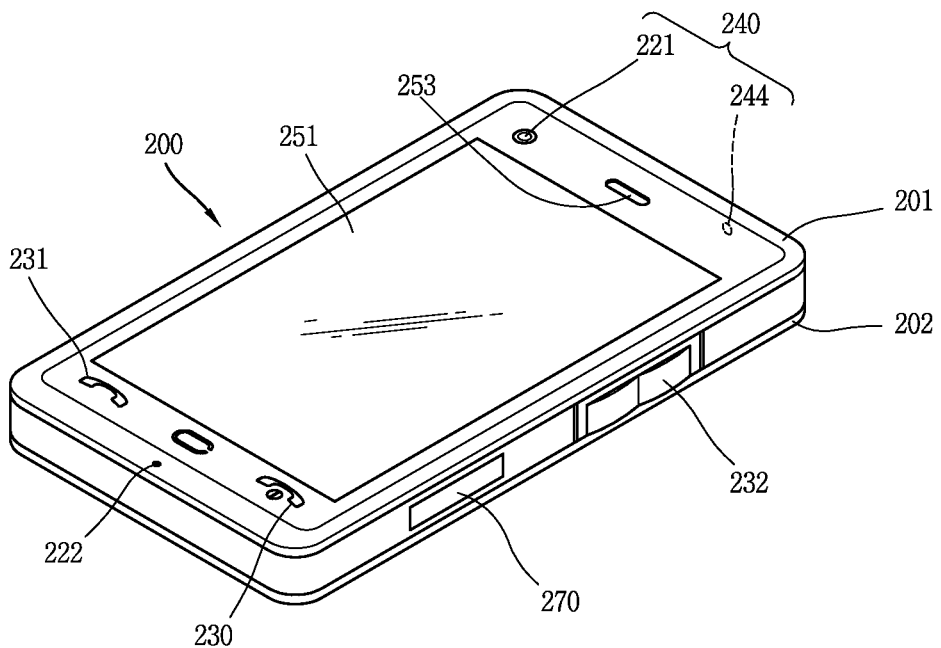
FIG. 2A is a front perspective view of the mobile terminal according to the first embodiment.

Embodiments of the invention will now be described in more detail, with reference to the accompanying drawings. Hereinafter, the use of the terms "module" or "unit or portion" with respect to components described in this description is merely for ease of description. Thus, it is not intended that these terms have a specific meaning or function. The terms "module" and "unit or portion" can be used together.

Mobile terminals may be implemented using a variety of different types of terminals. Examples of such terminals include mobile terminals, such as mobile phones, smart phones, notebook computers, digital broadcast terminals, Personal Digital Assistants (PDA), Portable Multimedia Players (PMP), navigators and the like, and stationary terminals, such as digital TVs, desktop computers and the like. The following description assumes that the terminal is a mobile terminal. However, it will be appreciated by those skilled in the art that features described in the following description can be applied to stationary terminals which may include components not particularly configured for facilitating mobility.

FIG. 1 is a block diagram of a mobile terminal in accordance with one embodiment of the present invention.

The mobile terminal 100 may include components, such as a wireless communication unit 110, an Audio/Video (A/V) input unit 120, a user input unit 130, a sensing unit 140, an output unit 150, a memory 160, an interface unit 170, a controller 180, and a power supply unit 190. FIG. 1 illustrates the mobile terminal 100 as having various components, but it is understood that implementing all of the illustrated components is not a requirement. A greater or fewer number of components may be implemented.

Components of the mobile terminal 100 will now be described.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless Internet module 113, a short-range communication module 114, and a location information (or position location) module 115.

The broadcast receiving module 111 receives a broadcast signal and/or broadcast associated information from an external broadcast managing entity via a broadcast channel. Examples of broadcast associated information may include information associated with a broadcast channel, a broadcast program, a broadcast service provider, and the like. The broadcast associated information may be provided via a mobile communication network, and received by the mobile communication module 112.

Broadcast signals and/or broadcast associated information received via the broadcast receiving module 111 may be stored in a suitable device, such as a memory 160.

The mobile communication module 112 transmits/receives wireless signals to/from at least one network entity (e.g., base station, an external mobile terminal, a server, etc.) on a mobile communication network. The wireless signals may include an audio call signal, a video call signal, or various data formats for transmission/reception of text/multimedia messages.

The wireless Internet module 113 supports wireless Internet access for the mobile terminal. This module may be internally or externally coupled to the mobile terminal. Examples of wireless Internet access may include Wireless LAN (WLAN), Wi-Fi, Wireless Broadband (Wibro), World Interoperability for Microwave Access (Wimax), High Speed Downlink Packet Access (HSDPA), and the like.

The short-range communication module 114 is a module for short-range communications. Suitable technologies for implementing this module may include BLUETOOTH, Radio Frequency IDentification (RFID), Infrared Data Association (IrDA), Ultra-WideBand (UWB), ZigBee, and the like.

The location information (or position location) module 115 is a module for detecting or calculating a position of a mobile terminal. An example of the position location module 115 may include a Global Position System (GPS) module.

With continued reference to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit (or display) 151.

The image frames processed by the camera 121 may be stored in the memory 160 or transmitted outside of the mobile terminal 100 via the wireless communication unit 100. Two or more cameras 121 may be provided according to one embodiment of the mobile terminal 100.

The microphone 122 may receive an external audio signal while the mobile terminal is in a particular mode, such as a phone call mode, a recording mode, a voice recognition mode, or the like. This audio signal is processed into digital data. The processed digital data is converted for output into a format that may be transmitted to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, in order to generate a sensing signal for controlling the operation of the mobile terminal 100. For example, regarding a slide-type mobile terminal, the sensing unit 140 may sense whether a sliding portion of the mobile terminal is open or closed. Also for example, the sensing unit 140 may perform sensing functions, such as sensing the presence or absence of power provided by the power supply unit (or power supply) 190, the presence or absence of a coupling or other connection between the interface unit 170 and an external device, and the like. The sensing unit 140 may include a proximity sensor 141.

The output unit 150 is configured to output an audio signal, a video signal or an alarm signal. The output unit 150 may include a display unit (or display) 151, an audio output module 153, an alarm unit 154, and a haptic module 155.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI, and the like.

The display unit 151 may include at least a Liquid Crystal Display (LCD), a Thin Film Transistor-LCD (TFT-LCD), an Organic Light Emitting Diode (OLED) display, a flexible display, a three-dimensional (3D) display, an e-ink display, or similar display devices.

Some of these devices (e.g., transparent displays) may be transparent to allow viewing of an external environment. A transparent display may be, for example, a TOLED (Transparent Organic Light Emitting Diode) display, or the like. The rear structure of the display unit 151 may include a light-transmissive structure. With such a structure, the user can view an object located at a rear side of the body of the mobile terminal through a region of the body occupied by the display unit 151.

The mobile terminal 100 may include two or more display units according to one embodiment. For example, a plurality of display units may be separately or integrally disposed on one surface or disposed on both surfaces of the mobile terminal.

According to various embodiments, the display unit 151 and a touch sensitive sensor (or touch sensor) form an interlayer structure. The structure may be referred to as a touch screen. The display unit 151 may then be used as an input device in addition to being used as an output device. The touch sensor may be implemented using a touch film, a touch sheet, a touch pad, and the like.

The touch sensor may be configured to convert changes of a pressure applied to a specific part of the display unit 151, or a capacitance occurring from (or sensed at) a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

With continued reference to FIG. 1, the proximity sensor 141 may be arranged at an inner region of the mobile terminal 100 covered by the touch screen, or near the touch screen. The proximity sensor may sense a presence or absence of an object approaching a surface to be sensed, or an object disposed near a surface to be sensed, by using an electromagnetic field or infrared rays without requiring mechanical contact. The proximity sensor may provide a longer lifespan and greater utility compared to a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and similar devices. When the touch screen is implemented as a capacitance type touch screen, the proximity of a pointer to the touch screen is sensed by changes of an electromagnetic field. In this case, the touch screen (touch sensor) may be considered as a proximity sensor.

Also, the display unit 151 may be configured as a stereoscopic display unit 152 for displaying a stereoscopic image.

The stereoscopic image may be a three-dimensional (3D) stereoscopic image. The 3D stereoscopic image is an image that allows a viewer to sense that a gradual depth and reality of an object displayed on a monitor or a screen is the same as (or approximates) those of an object in three-dimensional space. A 3D stereoscopic image is implemented by using binocular disparity. Binocular disparity refers to a disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as a stereoscopic scheme (a glasses scheme), an auto-stereoscopic scheme (a glasses-free scheme), a projection scheme (holographic scheme), or the like. Stereoscopic schemes commonly used for home television receivers, or the like, include the Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image includes a left image (a left eye image) and a right image (a right eye image). Also, for a 3D thumbnail image, a left image thumbnail and a right image thumbnail are generated, respectively, from a left image and a right image of an original frame image, and then combined to generate a single 3D thumbnail image. In general, a thumbnail refers to a reduced image or a reduced still image. The generated left image thumbnail and right image thumbnail are displayed with a horizontal distance difference therebetween by a depth corresponding to the disparity between the left image and the right image on the screen, thereby providing a stereoscopic space sense.

A left image and a right image required for implementing a 3D stereoscopic image may be displayed on the stereoscopic display unit 152 by a stereoscopic processing unit. The stereoscopic processing unit may receive the 3D image and extract the left image and the right image, or may receive the 2D image and change it into a left image and a right image.

When a touch sensor is overlaid on the stereoscopic display unit 152 in a layered manner, or when the stereoscopic display unit and a 3D sensor sensing a touch operation are combined, the stereoscopic display unit 152 may also be used as a 3D input device.

As examples of the 3D sensor, the sensing unit 140 may include a proximity sensor 141, a 3D touch (or stereoscopic touch) sensing unit 142, an ultrasonic sensing unit 143, and a camera sensing unit 144.

The proximity sensor 141 detects the distance between a sensed object (e.g., the user's finger or a stylus) applying a touch and a detect surface by using the force of electromagnetism or infrared rays without a mechanical contact. By using the distance, the terminal recognizes which portion of a stereoscopic image has been touched. In particular, when the touch screen is an electrostatic touch screen, the degree of proximity of the sensed object is detected based on a change of an electric field according to proximity of the sensed object, and a touch of the 3D image is recognized by using the degree of proximity.

The stereoscopic touch sensing unit 142 is configured to detect the strength or duration of a touch applied to the touch screen. For example, the stereoscopic touch sensing unit 142 may sense a touch pressure. When the pressure is strong, it may recognize the touch as a touch with respect to an object displayed as being located farther away from the touch screen (e.g., farther away from the user) toward the interior of the mobile terminal.

The ultrasonic sensing unit 143 is configured to recognize position information of the sensed object by using ultrasonic waves. The ultrasonic sensing unit 143 may include, for example, an optical sensor (e.g., an optical sensor of the camera 121) and a plurality of ultrasonic sensors.

The optical sensor is configured to sense light. For example, the sensed light may include ultraviolet rays, and the optical sensor may be an infrared port using infrared data association (IRDA).

The ultrasonic sensors may be configured to sense ultrasonic waves. A plurality of ultrasonic sensors are disposed to be spaced apart. Accordingly, the plurality of ultrasonic sensors have a time difference in sensing ultrasonic waves generated from the same position or an adjacent position.

The camera sensing unit 144 includes at least a camera, a photo sensor, or a laser sensor.

For example, the camera and the laser sensor may be combined to detect a touch of the sensed object with respect to a 3D stereoscopic image. When distance information detected by a laser sensor is added to a 2D image captured by the camera, 3D information can be obtained.

As another example, a photo sensor may be laminated on the display device. The photo sensor is configured to scan a movement of the sensed object in proximity to the touch screen. In more detail, the photo sensor includes photo diodes and transistors positioned along rows and columns in order to scan content mounted on the photo sensor by using an electrical signal that changes according to the quantity of applied light. In more detail, the photo sensor calculates the coordinates of the sensed object according to variation of light in order to obtain position information of the sensed object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer, or other sound generating device.

The alarm unit 154 outputs a signal for informing a user of an occurrence of an event of the mobile terminal 100. Events generated in the mobile terminal may include call signal reception, message reception, key signal inputs, a touch input, etc. In addition to video or audio signals, the alarm unit 154 may output signals in a different manner, for example, to inform the user of an occurrence of an event. The video or audio signals may be also output via the display unit 151 or the audio output module 153. Therefore, the display unit 151 and the audio output module 153 may be considered as parts of the alarm unit 154.

A haptic module 155 generates various tactile effects that the user may feel or sense. A typical example of the tactile effects generated by the haptic module 155 is vibration. The strength and pattern of the vibration generated by the haptic module 155 can be controlled. For example, different vibrations may be combined to be output or sequentially output.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., and an effect by reproducing the sense of cold and warmth using an element that can absorb or generate heat.

The haptic module 155 may be implemented to allow the user to feel (or sense) a tactile effect through muscle sensation (e.g., via the fingers or an arm of the user), as well as to transfer the tactile effect through a direct contact. Two or more haptic modules 155 may be provided according to one embodiment of the mobile terminal 100.

The memory 160 may store software programs used for processing and controlling operations performed by the controller 180, or may temporarily store data (e.g., a phonebook, messages, still images, video, etc.) that are input or output. In addition, the memory 160 may store data regarding various patterns of vibrations and audio signals output when a touch is input to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the interface unit 170 may transmit data to an external device, receive and transmit power to each element of the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the mobile terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured to be within the controller 180 or may be configured to be separate from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or similar medium using, for example, software, hardware, or any combination of software and hardware.

For hardware implementation, the embodiments described herein may be implemented by using at least application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform the functions described herein. In some cases, such embodiments may be implemented by the controller 180 itself.

For software implementation, procedures or functions described herein with respect to various embodiments may be implemented by separate software modules. Each software module may perform one or more functions or operations described herein. Software code can be implemented by a software application written in any suitable programming language. The software code may be stored in the memory 160 and executed by the controller 180.

A method for processing a user input with respect to the mobile terminal will now be described.

The user input unit 130 is manipulated to provide a command for controlling the operation of the mobile terminal 100 and may include a plurality of manipulation units. The manipulation units may be generally referred to as a manipulating portion, and various methods and techniques can be employed for implementing the manipulation portion so long as they can be operated by the user in a tactile manner.

Various types of visual information may be displayed on the display unit 151. The information may be displayed in the form of characters, numbers, symbols, graphics, icons, etc, or may be configured as a 3D stereoscopic image.

In order to input such information, at least the characters, numbers, symbols, graphics or icons are displayed in a certain array so as to be implemented in the form of a keypad. Such a keypad may be called a 'soft key' or 'soft keys.'

The display unit 151 may be operated as a whole region or may be divided into a plurality of regions and accordingly operated. In the latter case, the plurality of regions may be operated in association with each other.

For example, an output window and an input window may be displayed at upper and lower portions of the display unit 151, respectively. The output window and the input window are regions allocated for outputting or inputting information, respectively. Soft keys including numbers for inputting a phone number, or the like, are output to the input window. When the soft key is touched, a number, or the like, corresponding to the touched soft key is displayed on the output window. When a first manipulation unit is manipulated, a call connection with respect to a phone number displayed on the output window is attempted, or text displayed on the output window may be input to an application.

The display unit 151 or the touch pad may be configured to receive a touch through scrolling. The user may move a cursor or a pointer positioned on an entity, e.g., an icon, or the like, displayed on the display unit 151, by scrolling the display unit 151 or the touch pad. In addition, when the user moves his fingers on the display unit 151 or the touch pad, the path along which the user's fingers move may be visually displayed on the display unit 151. This would be useful in editing an image displayed on the display unit 151.

One function of the terminal may be executed when the display unit 151 (e.g., touch screen) and the touch pad are touched together within a certain time range. The two touches may effectively clamp the terminal body between the user's thumb and index finger. The one function may be, for example, activation or deactivation of the display unit 151 or the touch pad.

Hereinafter, a mechanism for accurately recognizing a touch input with respect to a stereoscopic image displayed on the mobile terminal 100 will be described in more detail.

Figure 2B:
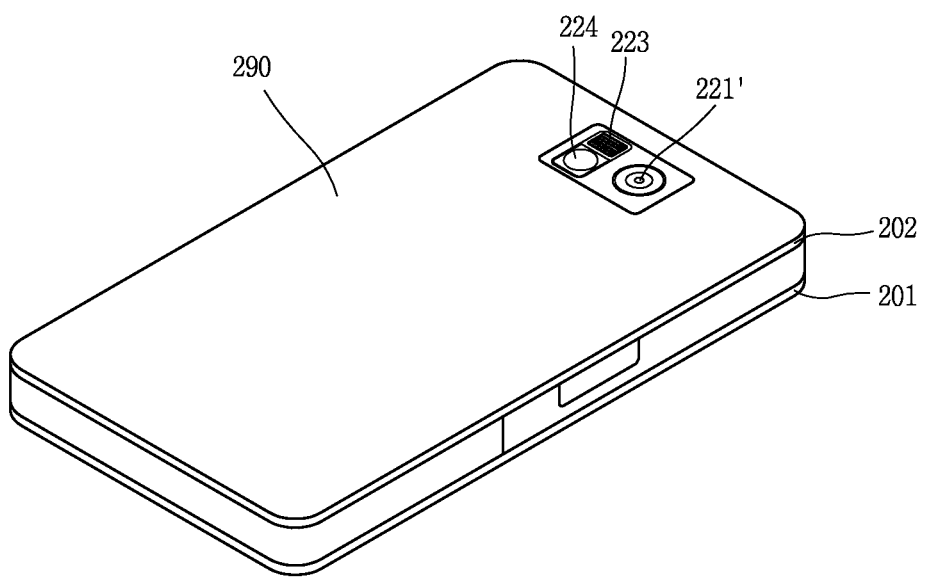
FIG. 2B is a rear perspective view of the mobile terminal shown in FIG. 2A.

FIG. 2A is a front perspective view of the mobile terminal according to an embodiment of the present invention. FIG. 2B is a rear perspective view of the mobile terminal as shown in FIG. 2A.

The mobile terminal 200 has a bar type terminal body. However, features of embodiments of the present invention are not limited to this type of configuration, and may be applicable to a slide type mobile terminal, a folder type mobile terminal, a swing type mobile terminal, a swivel type mobile terminal, etc., in which two or more bodies are combined to be movable relative to one another.

The body includes a case (or casing, housing, cover, etc.) constituting the external appearance. According to one embodiment, the case may include a front case 201 and a rear case 202. Various electronic components are installed in the space between the front case 201 and the rear case 202. One or more intermediate cases may be additionally disposed between the front case 201 and the rear case 202.

The cases may be formed by injection-molding a synthetic resin or may be made of a metallic material such as stainless steel (STS), titanium (Ti), etc.

A stereoscopic display unit 251, a sensing unit 240, an audio output unit 253, a camera 221, user input units 230, 231, a microphone 222, an interface unit 270, etc. may be disposed on the terminal body, mainly, on the front case 201.

The stereoscopic display unit 251 occupies the largest portion of a circumferential surface of the front case 201. The audio output unit 253 and the camera 221 are disposed at a region adjacent to one end portion of the stereoscopic display unit 251, and the user input units 230, 231 and the microphone 222 are disposed at a region adjacent to the other end portion of the stereoscopic display unit 251. The user input unit 232 and the interface unit 270 may be disposed at the sides of the front case 201 and the rear case 202.

The user input unit is manipulated to receive a command for controlling the operation of the mobile terminal 200 and may include a plurality of manipulation units 230, 231 and 232. The manipulation units 230, 231 and 232 may be generally referred to as a manipulating portion, and various methods and techniques can be employed for implementing the manipulation portion so long as they can be operated by the user in a tactile manner.

Content input by the manipulation units can be variably set. For example, the first manipulation unit 231 may receive a command such as starting, ending, scrolling, etc., and the second manipulation unit 232 may receive a command such as controlling of the volume of a sound output from the audio output unit 253 or conversion into a touch recognition mode of the display unit 251. The stereoscopic display unit 251 may form a stereoscopic touch screen together with the sensing unit 240, and the stereoscopic touch screen may be an example of a user input unit.

The sensing unit 240, a 3D sensor, is configured to detect a 3D position of a detection object applied a touch. The sensing unit 240 may include a camera 221 and a laser sensor 244. The laser sensor 244 is mounted on the terminal body. The laser sensor 244 scans laser, and detects reflected laser, to thereby detect the distance between the terminal body and the detected object. However, embodiments of the present invention are not limited thereto and the sensing unit 240 may be configured in the form of a proximity sensor, a stereoscopic touch sensing unit, an ultrasonic sensing unit, or the like.

With reference to FIG. 2B, a camera 221' may additionally be disposed on the rear surface of the terminal body, namely, on the rear case 202. The camera 221' may capture images with respect to a direction that is substantially opposite to that of the camera 221 (see FIG. 2A), and may have a different number of pixels than the camera 221.

For example, the camera 221 may have a smaller number of pixels to capture an image of the user's face and transmit such an image to another party, and the camera 221' may have a larger number of pixels to capture an image of a general object which, in most cases, are not for immediate transmission. The cameras 221 and 221' may be installed on the terminal body such that they can be rotatable or popped up.

A flash 223 and a mirror 224 may be additionally disposed adjacent to the camera 221'. When an image of a subject is captured with the camera 221', the flash 223 illuminates the subject. The mirror 224 allows the user to see himself when he wants to capture his own image (i.e., self-image capturing) by using the camera 221'.

An audio output unit may be additionally disposed on the rear surface of the terminal body. The audio output module may implement stereophonic sound functions in conjunction with the audio output module 253 (see FIG. 2A) and may be also used for implementing a speaker phone mode for call communication.

A power supply unit 290 for supplying power to the mobile terminal 200 is mounted on the terminal body. The power supply unit 290 may be installed within the terminal body or may be directly attached to or detached from the exterior of the terminal body.

In addition to an antenna for a call, or the like, mounted on the terminal body, a broadcast signal receiving antenna, a Bluetooth™ antenna, a satellite signal receiving antenna, an antenna for receiving data of wireless Internet, or the like, may be additionally disposed. A mechanism for implementing the mobile terminal of FIGS. 2A and 2B is installed in the terminal body.

A communication system operable with a mobile terminal according to embodiments of the invention will now be described with reference to FIG. 3.

Such communication systems utilize different air interfaces and/or physical layers. Examples of air interfaces utilized by the communication systems include Frequency Division Multiple Access (FDMA), Time Division Multiple Access (TDMA), Code Division Multiple Access (CDMA), Universal Mobile Telecommunications System (UMTS), the Long Term Evolution (LTE) of the UMTS, the Global System for Mobile Communications (GSM), and the like. By way of non-limiting example, further description will relate to a CDMA communication system, but it is understand that described features apply equally to other system types, including the CDMA wireless communication system.

Figure 3:
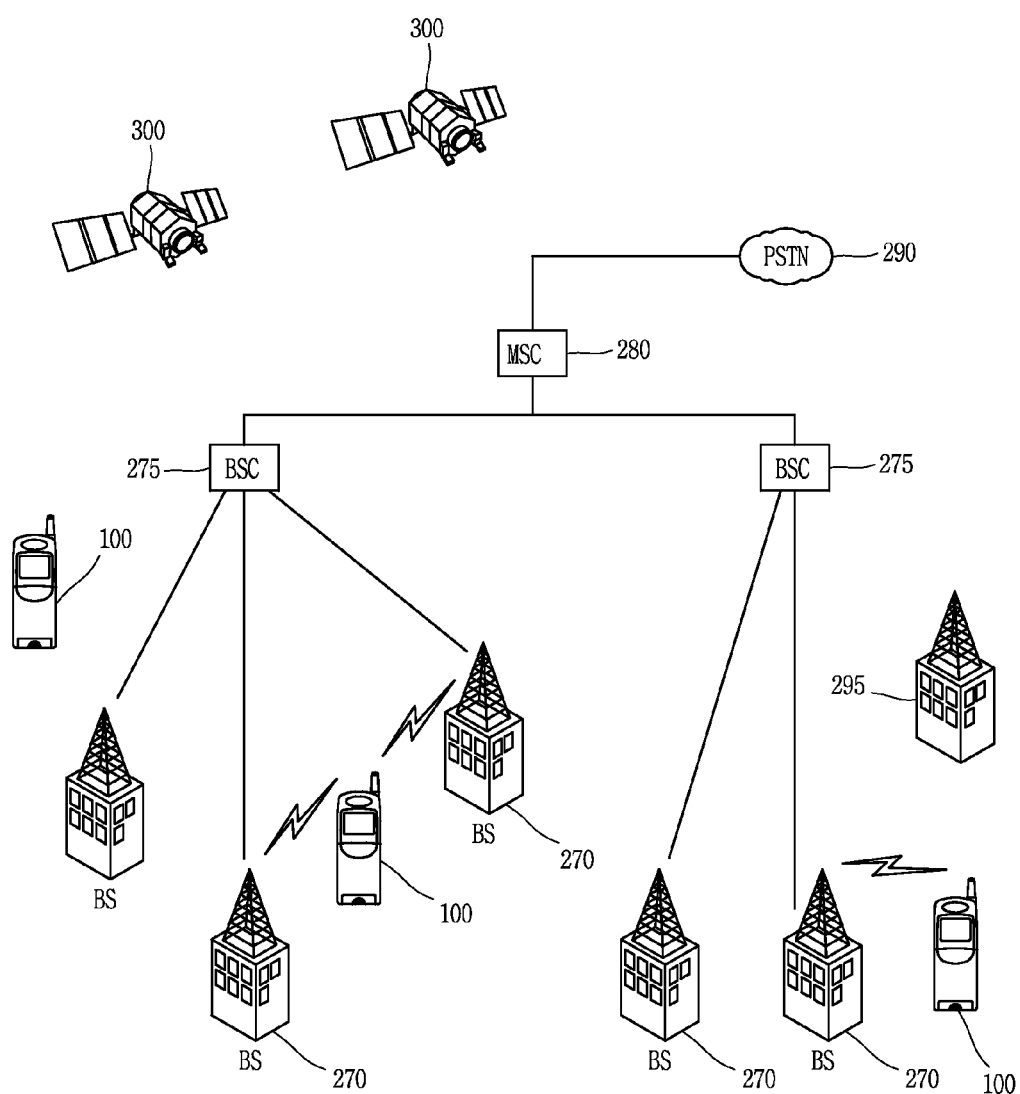
FIG. 3 is a block diagram of a wireless communication system operable with the mobile terminal in accordance with the first embodiment.

Referring to FIG. 3, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, Asynchronous Transfer Mode (ATM), Internet Protocol (IP), PPP, Frame Relay, High-bit-rate digital subscriber line (HDSL), Asymmetric Digital Subscriber Line (ADSL), or DSL technologies (xDSL). Hence, the plurality of BSCs 275 can be included in the system as shown in FIG. 3.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 3, transmits a broadcast signal to the mobile terminals 100 operating within the system. The broadcast receiving module 111 (see FIG. 1) is typically configured inside the mobile terminal 100 to receive broadcast signals transmitted by the BT 295.

FIG. 3 further depicts several Global Positioning System (GPS) satellites 300. Such satellites 300 facilitate locating the position of at least one of the mobile terminals 100. Two satellites are depicted in FIG. 3, but it is understood that useful position information may be obtained with a greater or fewer number of satellites. The location information module 115 (e.g., GPS module) (see FIG. 1) is typically configured to cooperate with the satellites 300 to obtain desired position information. It is appreciated that other types of position detection technology, (i.e., location technology that may be used in addition to or instead of GPS location technology) may alternatively be implemented. If desired, at least one of the GPS satellites 300 may alternatively or additionally be configured to provide satellite Digital Multimedia Broadcasting (DMB) transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

3D Stereoscopic Image

In general, a 3D stereoscopic image (hereinafter, referred to as '3D image') refers to an image that allows a viewer to sense that a gradual depth and reality of an object displayed on a monitor or a screen is the same as (or approximates) those of an object in three-dimensional space. The 3D stereoscopic image is implemented by using binocular disparity. Binocular disparity refers to a disparity made by the positions of two eyes which are set apart from each other. When two eyes view different 2D images, the images are transferred to the brain through the retina and combined in the brain to provide the perception of depth and reality sense.

The 3D image may be displayed according to a 3D display scheme, such as a stereoscopic scheme (a glasses scheme), an auto-stereoscopic scheme (a glasses-free scheme), a projection scheme (holographic scheme), or the like.

Generation and Displaying of 3D image

In general, a 3D stereoscopic image includes a left image (a left eye image) and a right image (a right eye image). According to how left and right images are combined into a 3D stereoscopic image, the 3D stereoscopic imaging method may be a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, or a time sequential (or frame by frame) method in which left and right images are alternately displayed over time. The generated 3D image is displayed on the display unit 151 with a sense of depth.

Depth of 3D Image

Depth (or a depth value) of a 3D image refers to an index indicating the difference in a 3D distance among objects within the image. The depth is defined to have 256 levels (a maximum value of 255 to a minimum value). As the value of the depth increases, the image appears to be closer to the user.

In more detail, when a user views an object on the display unit 151, if the object is viewed in a 2D form, a 3D depth value of the object is "0". However, if the object is viewed in a 3D form, for example, when the object appears to be protruding out from the mobile terminal 100 based on the display unit 151, the 3D depth of the object has a minus (negative) value. Also, when the object appears to be recessed into the mobile terminal 100, the 3D depth of the object has a plus (positive) value.

That is, when the user views objects included in a 3D image that appear to be protruding out from the mobile terminal 100, an object which is viewed within a shorter distance has a greater absolute value of the 3D depth value expressed by the negative value.

For purposes of description, when a user views objects included in a 3D image that appear to be protruding out from the mobile terminal 100 based on the display unit 151, an object viewed within a shorter distance may be described as 'having a greater 3D depth value', and an object viewed at a longer distance may be represented as 'having a smaller 3D depth value.' These labels are understood by those of skill in the art.

In general, a 3D image is a stereoscopic image. A level of fatigue that a user experiences even from viewing an image having the same depth may differ according to surroundings, especially, ambient brightness and the eyesight of the user.

According to one embodiment, a method of improving a user's viewing of a 3D image and providing the user with viewing convenience includes automatically adjusting brightness of a screen (display) and the depth of the 3D image according to an ambient brightness which is sensed by measuring a quantity of external light through an optical sensor.

Accordingly, a brightness of a screen (display) may be adjusted by controlling brightness of a backlight based on previously stored control values according to ambient brightness, and brightness and depth of a 3D image may be adjusted by controlling a refractive index of a lenticular lens by moving parallax barriers (using moving parallax barriers) or adjusting a voltage in a 3D mode according to the ambient brightness.

Also, according to one embodiment, a method for controlling a depth and brightness of at least one object, which is selected from a 2D image, and a brightness of a background is performed in an automatic or selective manner upon operating in a partial 3D mode, in which only a specific object is selected from the 2D image and displayed in a 3D form using ambient brightness.

The control value may be a value previously stored in an information table of a memory in a state of being mapped with the ambient brightness. The control value may include values for screen brightness and depth of an entire 3D image in a full 3D mode, and include values for screen brightness, depth and brightness of a selected 3D object and background brightness in a partial 3D mode.

Also, according to one embodiment, a method for controlling screen brightness and depth of an object is performed in an automatic or selective manner according to attribute information (saturation, luminance and color) relating to the object when a 2D image is converted into a 3D image.

Conversion from 2D mode into 3D mode

A conversion from a 2D mode into a 3D mode and a depth adjustment at the moment of the conversion may be implemented by a moving (or switchable) parallax barrier mode and an active lenticular lens mode.

FIG. 4 is an exemplary view showing a moving parallax barrier type 3D mode.

As shown in FIG. 4, a moving parallax barrier mode is a mode of generating a disparity between a left eye and a right eye by installing barriers at the front end of a display. The barriers are installed at the same period (interval) as images. A slit, which is an open portion between the barriers, is set to have a viewing angle as one perpendicular line of an image. Upon facing the structure at a preset distance, a left image comes into the left eye and a right image comes into the right eye with images of the opposite eye being blocked.

In FIG. 4, the conversion from the 2D mode into the 3D mode may be implemented as the barriers are switched on or off. That is, as shown in an upper portion of FIG. 4, when the parallax barriers are switched off, the parallax barriers become transparent to operate in the 2D mode. When the parallax barriers are switched on (see bottom portion of FIG. 4), the parallax barriers create disparity between the left and right eyes so as to generate a sense of depth, to operate in the 3D mode. According to one embodiment, the depth of the 3D image may be controlled by moving the barriers according to a quantity of external light.

FIG. 5 is an exemplary view showing an active lenticular lens type 3D mode.

As shown in FIG. 5, an active lenticular lens mode is a mode in which an arrangement sheet of semi-cylindrical lenses, instead of the barriers, are covered on a screen, and images are sent to each of the left and right eyes using refractive indexes of the lenses. The conversion from a 2D mode into a 3D mode according to the lenticular lens mode may be implemented by changing the refractive index by applying a voltage to molecules of a liquid crystal filled in the semi-cylindrical transparent lens. That is, in a 2D mode as a state that a voltage is not applied (i.e., 0V), a difference in a refractive index is generated between liquid crystal molecules and an external replica so that light is transmitted through the lenticular lens. In addition, in a 3D mode as a voltage-applied state, a state of the liquid crystal changes to have the same refractive index as the external replica, so as to transmit input light through the lenses. Therefore, according to one embodiment, a sense of depth of a 3D image may be controlled by controlling strength of the voltage according to a quantity of external light.

Figure 6:
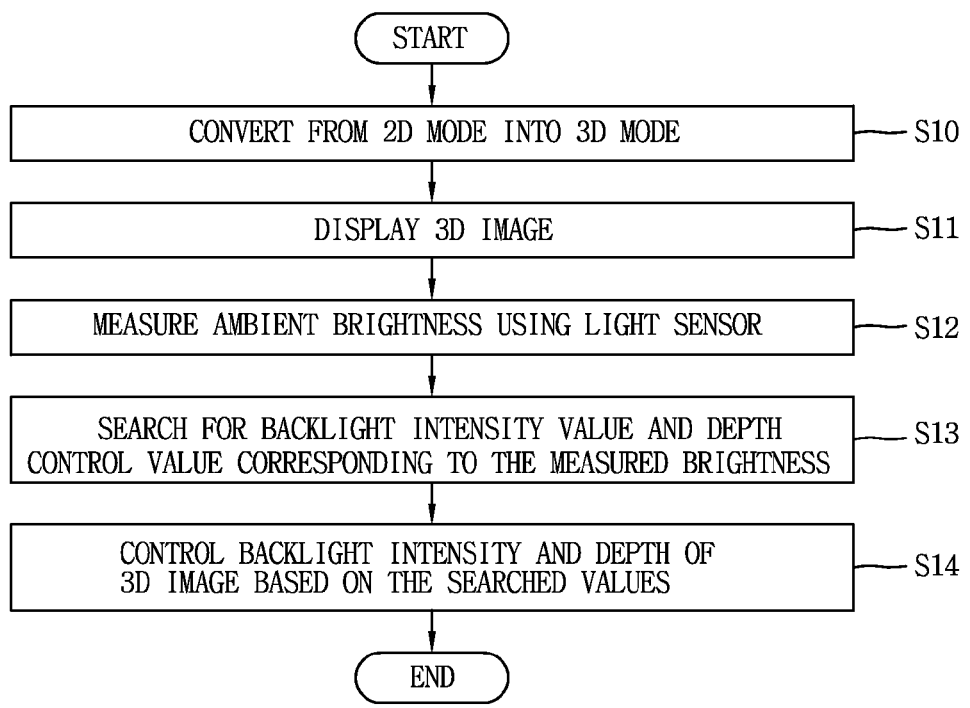
FIG. 6 is a flowchart illustrating a 3D image control method for a mobile terminal in accordance with one embodiment.

FIG. 6 is a flowchart illustrating a 3D image control method for a mobile terminal in accordance with one embodiment. According to the embodiment of FIG. 6, screen brightness and depth of a 3D image are automatically adjusted according to ambient brightness.

As shown in FIG. 6, a user may convert a mode of the mobile terminal from a 2D mode into a 3D mode using a mode conversion menu, an icon or a preset key input (S10).

When a user's 3D mode conversion input is detected, then the controller 180 may display a 3D image on the display unit 151 according to a 3D image displaying method (e.g., switchable (moving) parallax barrier method or the active lenticular lens method) (S11). When the 3D image is displayed, the controller 180 may control the screen brightness and the depth of an object according to attribute information (saturation, luminance and color) relating to the object, as will be described later, and then drive an optical sensor disposed in the sensing unit 140 to measure an ambient brightness by measuring a quantity of light near the mobile terminal (S12).

When the ambient brightness is measured, then the controller 180 may search for (or locate) an intensity value of a backlight and a control value of the depth of the 3D image (S13). The backlight intensity value and the depth control value may be stored in an information table stored in the memory 160, in which they are mapped with the measured ambient brightness level. Accordingly, the controller 180 may adjust the screen brightness by controlling the backlight to have the searched (or located) intensity, and controlling the depth of the 3D image based on the searched (or located) depth control value.

That is, when the 3D mode is implemented by the moving parallax barrier method (see FIG. 4), the controller 180 may control the backlight to have the searched (or located) intensity, and adjust the depth of the 3D image by moving the parallax barriers to correspond to the searched (or located) depth control value.

Similarly, when the 3D mode is implemented by the active lenticular lens method (see FIG. 5), the controller 180 may control the backlight to have the searched (or located) intensity, and adjust the depth of the 3D image by changing a voltage applied to the lenticular lenses based on the searched (or located) depth control value.

The information table stored in the memory 160 may store an optimal backlight intensity and an optimal depth value for each of a plurality of ambient brightness levels.

The described method of controlling corresponds to a full 3D mode in which an entire image is displayed in a 3D form. If a partial 3D mode is in operation, the controller 180 may control screen brightness and, thereafter, adjust depth and brightness of at least one 3D object selected by a user and screen brightness all according to ambient brightness.

That is, the controller 180 may compare the measured ambient brightness, depth of each object and screen brightness with preset reference values. When each object has a uniform depth according to the comparison (e.g., when every object is displayed in a 2D form), the controller 180 may adjust the brightness of the object and brightness of a background according to the measured ambient brightness. When the measured ambient brightness (luminance value) continuously belongs to an average value range, the controller 180 may adjust the brightness and depth of the 3D object and the brightness of the background according to the measured ambient brightness. When the screen (display) brightness is uniform, the controller 180 may adjust the depth of the 3D object and the brightness of the background according to the measured ambient brightness.

Figure 7:
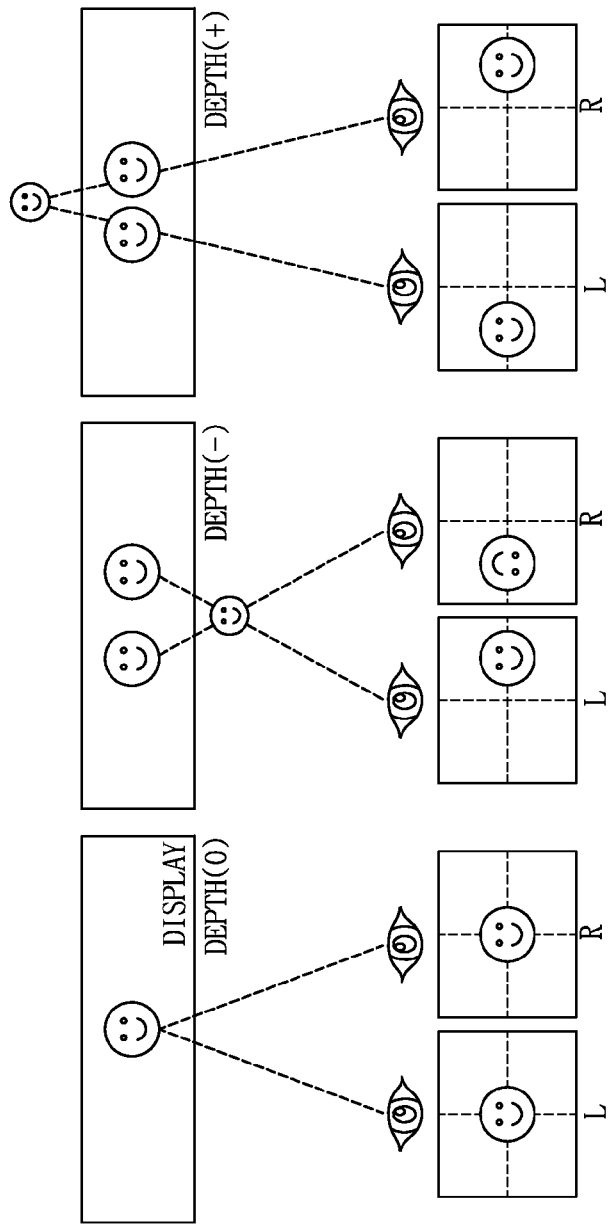
FIG. 7 illustrates the depth of a general 3D image.

FIG. 7 illustrates the depth of a general 3D image.

As shown in FIG. 7, when a user views a specific object (a smiling face) through the display unit 151, the depth value of "0" indicates a 2D displaying mode for the object (see left portion of FIG. 7). However, when the depth of the object has a minus (negative) or plus (positive) value, this indicates that the mobile terminal operates in the 3D mode (see middle and right portions of FIG. 7). Here, the depth with the minus (−) value refers to a state in which an object appears to be protruding from the front of the screen (based on the display unit), and the depth with the plus (+) value refers to a state in which the object appears to be retreating into the screen. These states are generated by disparity between a left eye (L) and a right eye (R) according to a distance between both eyes.

Figure 8:
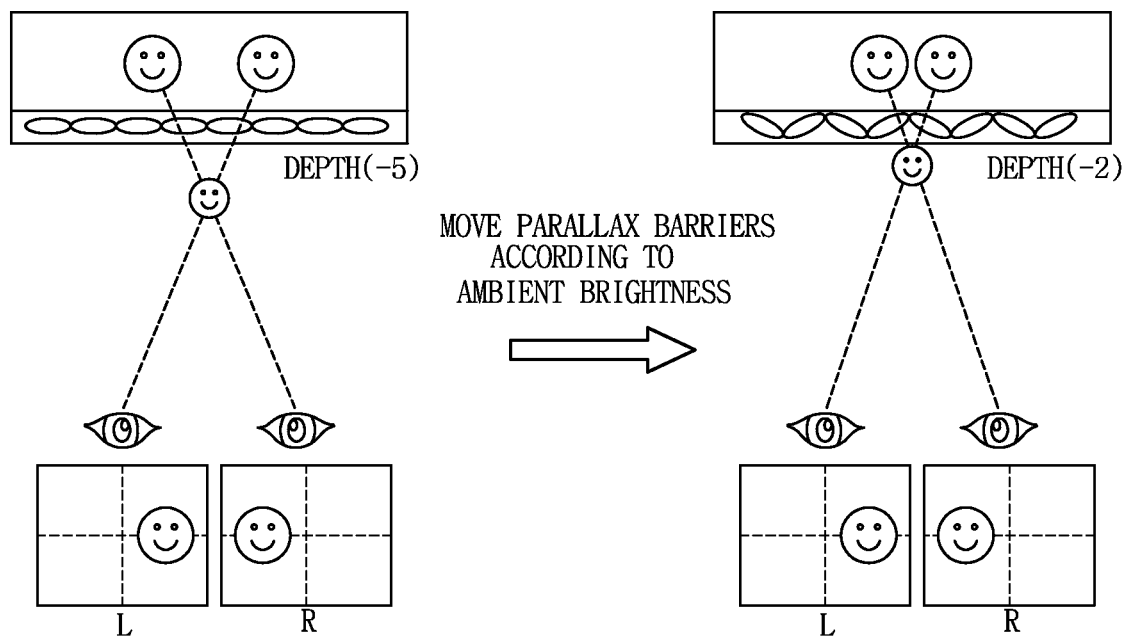
FIG. 8 illustrates the control of the depth of a 3D image based on ambient brightness measured by an optical sensor according to one embodiment.

FIG. 8 illustrates controlling the depth of a 3D image according to ambient brightness measured by an optical sensor according to one embodiment.

As shown in FIG. 8, when a user watches (views) a 3D image (e.g., a smiling face) using a mobile terminal at night or in a dark place such as a movie theater, the controller 180 may measure ambient brightness by activating an optical sensor. In a dark place (or if the surroundings are dark), the user may not experience a high degree of fatigue from recognizing the 3D image (i.e., high visibility) when a screen is not bright. However, when the screen is excessively bright in such a situation, the user may feel more fatigue.

Therefore, the controller 180 may control the backlight and the parallax barriers according to an intensity of the backlight and a depth value, which correspond to a corresponding ambient brightness level stored in the information table stored in the memory 160. This may allow for controlling the screen brightness and also reducing the depth value of the 3D image from −5 to −2 by moving the barriers to change a barrier angle (see FIG. 8). Accordingly, the 3D image may be adjusted to appear to be protruding from the dark screen to a lesser degree as compared to a previous screen before the adjustment. This may allow the user to feel less fatigue even if the user watches the adjusted 3D image at night or in the dark place for a long time.

When the user watches a 3D image using the mobile terminal during daytime or in a bright place, the controller 180 may control the backlight and the parallax barriers in an opposite manner. This is because, when external light is strong, the user may not easily view the 3D image, which is currently displayed on a screen (i.e., low visibility), and may not fully experience the depth of the image.

Here, the controller 180 may search for a backlight intensity control value and a depth control value corresponding to the measured ambient brightness level from the information table, to control the backlight intensity and the depth to increase, thereby improving the user's viewing of the 3D image.

In other words, the screen brightness may be controlled by focusing on the depth since the visibility is high when surroundings are dark. Also, both the screen brightness and the depth may be adjusted towards increasing the visibility since a problem is caused due to the low visibility when surroundings are bright.

When ambient brightness is not excessive, such as in the daytime or at night, problems may not occur in users' viewing of 3D images. The users may not experience inconveniences given the visibility of 3D images during most times in a 24-hour period. Therefore, if the user is able to selectively cause the control of the screen brightness and the depth according to the level of ambient brightness to be carried out, unnecessary control operations may be reduced.

Figure 9:
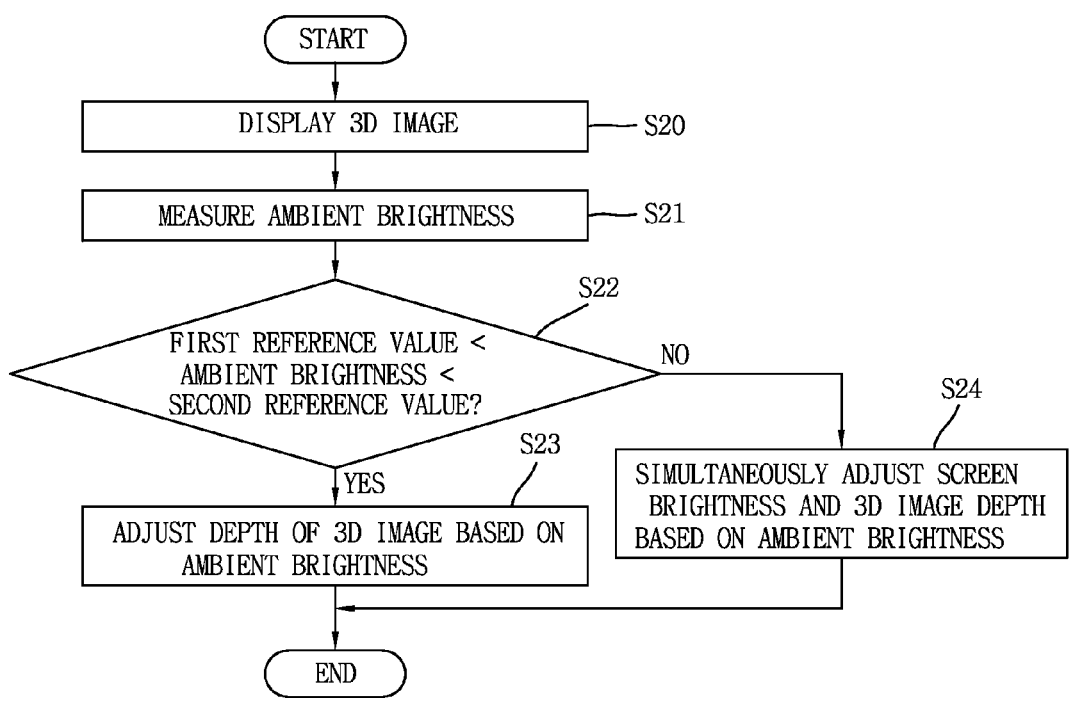
FIG. 9 is a flowchart showing a 3D image control method for a mobile terminal in accordance with another embodiment.

FIG. 9 is a flowchart illustrating a 3D image control method for a mobile terminal in accordance with one embodiment. According to the embodiment of FIG. 9, screen brightness and depth of a 3D image are selectively controlled according to ambient brightness.

When a user selects a mode conversion key or button located on one side of the mobile terminal or on a screen while a specific image is output (or reproduced) on the display unit 151, then the controller 180 may display a 3D image on the display unit 151 (S20). Here, the user may select a full 3D mode or a partial 3D mode.

When the 3D image is displayed, the controller 180 may check user settings to confirm whether or not a "3D image automatic adjustment" menu (or setting) has been set. The "3D image automatic adjustment" menu is a menu which is set when the user desires that screen brightness and depth of a 3D image be automatically adjusted according to ambient brightness.

When the 3D image automatic adjustment menu is in an "On" state, the controller 180 may activate an optical sensor to sense a quantity of light around the mobile terminal so as to measure ambient brightness (S21). Afterwards, the controller 180 may carry out a comparison to check whether or not the measured ambient brightness corresponds to an average value range that is between a first reference value and a second reference value (S22).

The average value range may correspond to a brightness value during daytime when the user generally is active. The first reference value may a brightness value measured at night or in a dark space, and the second reference value may be a brightness value measured outdoors in direct sunlight or in a space which is strongly lit.

When it is determined that the current ambient brightness of the mobile terminal belongs to an average value (or an average value range), which is greater than the first reference value and smaller than the second reference value, the controller 180 may search for a depth value corresponding to the corresponding ambient brightness from the information table stored in the memory 160, and control only the depth of the 3D image (S23).

Also, when the ambient brightness (luminance value) belongs to the average value range and the partial 3D mode is in operation, the controller 180 may search for brightness and depth values of a specific 3D object and a background brightness, which all correspond to the ambient brightness, from the information table. The controller then adjusts the brightness and depth of the 3D object and the background brightness based on the searched (or located) values.

When the current ambient brightness level of the mobile terminal is smaller than the first reference value or greater than the second reference value (i.e., the current ambient brightness level is outside of the average value range), the controller 180 may search for a backlight intensity control value and a depth control value corresponding to the ambient brightness from the information table. The controller 180 then adjusts the backlight intensity and the depth of the 3D image (S24) (see also FIG. 8).

When the partial 3D mode is in operation and an object has a uniform depth value (i.e., 2D), the controller 180 may adjust a brightness of the object and background brightness according to the ambient brightness (luminance value). When the screen (display) brightness is uniform, the controller 180 may adjust both the depth of the object and the background brightness according to the ambient brightness.

Consequently, the screen brightness and the depth of the 3D image may be selectively controlled according to the ambient brightness, resulting in reduction of unnecessary battery and/or power consumption which is caused due to a backlight being controlled to have high intensity.

As described earlier with respect to display of 3D images on a display unit, different users may have different physical conditions (e.g., eyesight). Therefore, each user feels (or experiences) fatigue differently while watching the 3D image. Thus, even if screen brightness and depth of the 3D image are automatically adjusted, some users may still feel fatigue from viewing the adjusted 3D image.

Therefore, according to one embodiment, a depth adjustment member, for example, a 3D adjustment indicator, is provided to allow a user to directly control screen brightness and a sense of depth suitable for his or her eyes. At least one 3D adjustment indicator may be displayed in the form of a 3D icon or a 3D bar that is located on a lower or side portion where it does not shield (or significantly obstruct) the 3D image.

Figure 10A:
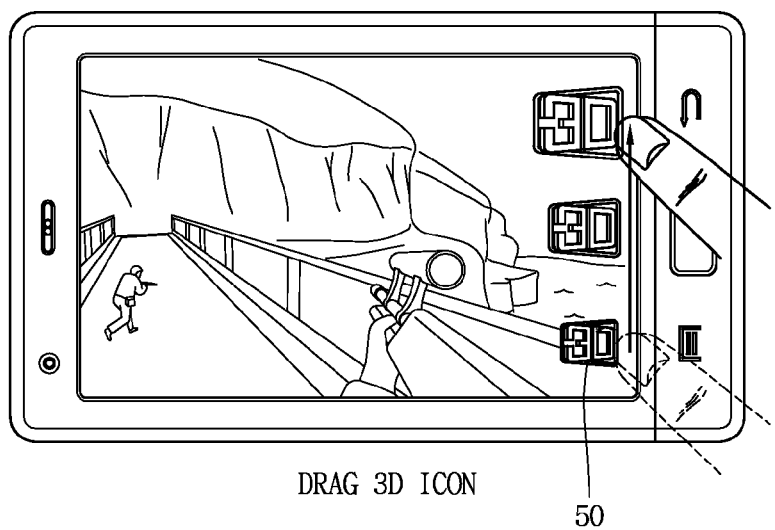

FIGS. 10A and 10B illustrate an adjustable user interface (UI) for allowing a user to adjust the depth of a 3D image according to various embodiments.

With respect to FIG. 10A, a depth of a 3D image is adjusted using a 3D icon 50 located on a lower right portion of a display unit or a screen. With respect to FIG. 10B, a depth of a 3D image is adjusted using a 3D bar 51 displayed over a right portion of a display unit or a screen.

In FIG. 10A, when a user touches the 3D icon 50 and drags it in an upward direction, the controller 180 may increase a size of the 3D icon 50 and gradually increase the depth of the 3D image (i.e., a minus depth value). Here, the controller 180 may control a backlight in correspondence with the increasing depth, providing optimal screen brightness.

When the user stops dragging the 3D icon 50, leaving the 3D icon 50 at a specific position, the user may check the depth of the 3D image directly with his eyes. Here, the controller 180 may maintain the depth and the screen brightness corresponding to the specific position.

As another example, the user may repeatedly touch the 3D icon 50 that is displayed at a certain (or initial) position without dragging the 3D icon 50. Accordingly, the controller 180 may change the depth of the 3D image and the screen brightness according to the number of times the 3D icon 50 is touched.

With reference to FIG. 10B, the user may scroll the 3D bar 51 to directly adjust optimal screen brightness and a depth of a 3D image. When the user scrolls the 3D bar 51, the controller 180 may control the depth of the 3D image and the screen brightness suitable for the depth, similar to the manner described earlier with reference to FIG. 10A. When the scroll of the 3D bar 51 is stopped on a specific position, the controller 180 may maintain the depth and the screen brightness corresponding to the specific position. In this state, the user may repetitively touch 3D bar 51 at the corresponding position to further manually control the screen brightness.

The features described with respect to FIGS. 10A and 10B may be applied together in the embodiments of FIGS. 6 and 9 when the 3D image automatic adjustment menu is set to "On".

Figure 11:
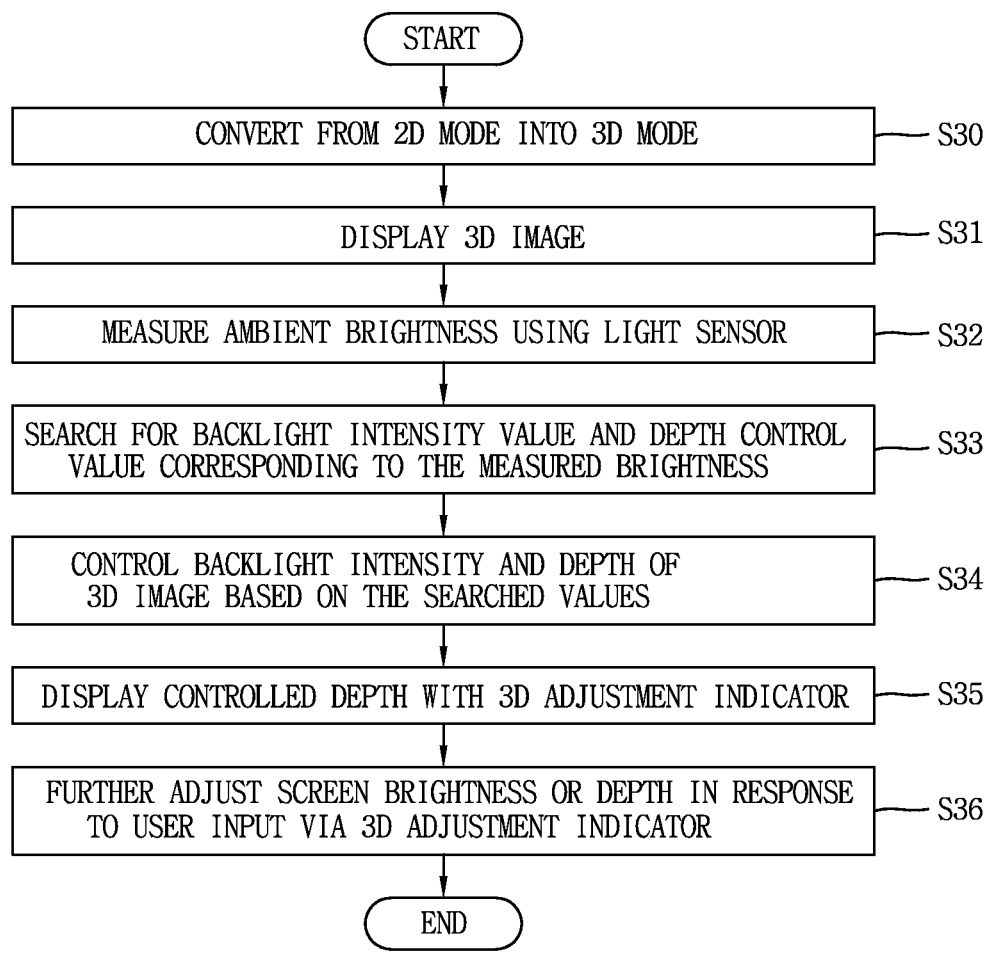
FIG. 11 is a flowchart showing a 3D image control method for a mobile terminal in accordance with another embodiment.

FIG. 11 is a flowchart illustrating a 3D image control method for a mobile terminal in accordance with one embodiment. According to the embodiment of FIG. 11, screen brightness and depth of the 3D image are additionally controlled according to a user input.

When screen brightness and depth of a 3D image are automatically adjusted (e.g., by performing operations illustrated in FIG. 6) (S30, S31, S32, S33, S34), the controller 180 may display how much the depth of the 3D image has been adjusted on one side of the screen via a 3D adjustment indicator (S35) (see, e.g., FIG. 10A or 10B). Here, one or two 3D adjustment indicators may be displayed in the form of a bar or an icon.

The user may recognize a currently adjusted level of the depth by checking the displayed 3D adjustment indicator, and further adjust the depth of the 3D image and the screen brightness using the 3D adjustment indicator (S36).

For example, when a 3D adjustment indicator is displayed, the user may adjust the depth of the 3D image by moving the 3D adjustment indicator and then adjust the screen brightness by selecting a specific value from values which appear as the 3D adjustment indicator is touched.

As another example, a sense of depth is adjusted by touching the 3D adjustment indicator and moving it in a downward direction, and screen brightness is adjusted by touching the 3D adjustment indicator and moving it in an upward direction.

Also, when two 3D adjustment indicators are displayed, i.e., when two indicators for individually adjusting a sense of depth and screen brightness are displayed in a vertical direction or in horizontal and vertical directions, respectively, the user may adjust the depth and the screen brightness individually by moving the corresponding 3D adjustment indicator.

For purposes of brevity, adjustment of the screen brightness has been described. However, other parameters may be adjusted according to embodiments of the invention. For example, in addition to the screen brightness, optimal screen brightness and optimal depth of a 3D image may be stored in an information table (or mapping table) in a mapped state according to a size (change) of the 3D image, or a screen change (a landscape view or a portrait view) of a mobile terminal. This may facilitate an automatic adjustment of the screen brightness and the depth based on the corresponding information.

Figure 12:
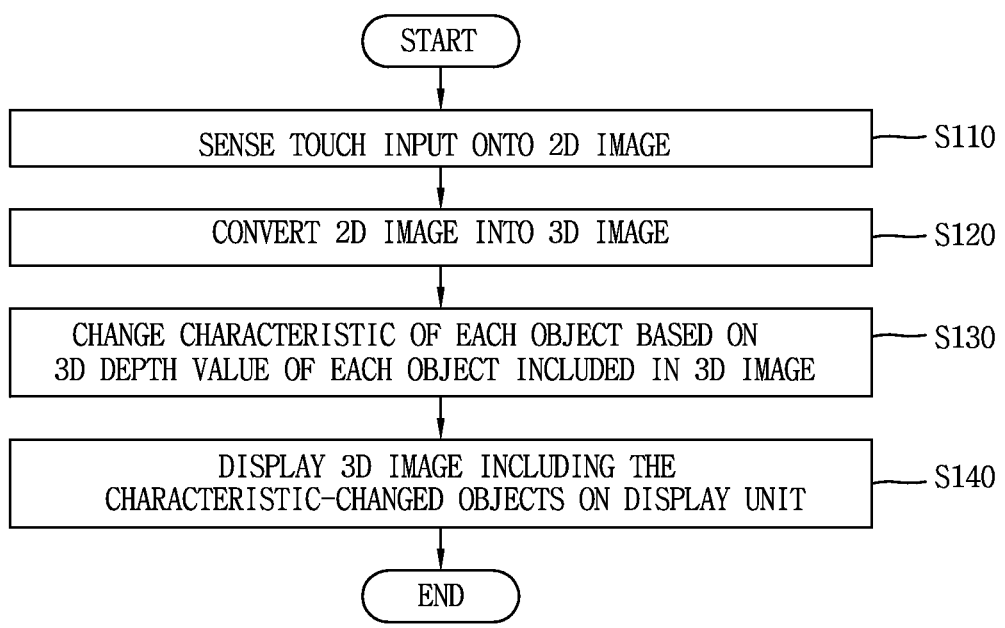
FIG. 12 is a flowchart showing a 3D image control method for a mobile terminal in accordance with another embodiment.

FIG. 12 is a flowchart illustrating a 3D image control method for a mobile terminal in accordance with one embodiment. According to the embodiment of FIG. 12, a depth is controlled upon conversion from a 2D mode to a 3D mode.

When a touch input applied on a 2D image is sensed while the 2D image is displayed on the display unit 151 (S110), the controller 180 may convert the 2D image into a 3D image (S120). Here, the controller 180 may allow a plurality of objects which are included in the 2D image to distinctively appear closer or farther away based on size, luminance and saturation of each of the plurality of objects, overlaying among the plurality of objects, and the like.

The controller 180 may convert the 2D image into the 3D image based on a complementary color contrast between a background color and a color of each object included in the 2D image. For example, when the background color and a color of a specific object are complementary, the controller 180 may increase a 3D depth value of the object such that the object can be highlighted to a greater degree upon conversion to the 3D image. Also, when the background of the 2D image contains a variety of colors, the controller 180 may decrease the 3D depth value to enhance visibility of the image upon conversion to the 3D image.

When the plurality of objects within the 2D image are overlaid, the controller 180 may convert the 2D image to the 3D image by recognizing the plurality of objects as one object. Also, when the 2D image includes more than a specific number of objects, the controller 180 may convert only a preset number of objects into a 3D form based on a size sequence, a brightness or vividness sequence or the like in association with the objects.

When the 2D image is converted to the 3D image, the controller 180 may change a characteristic of each object based on a 3D depth value of each object included in the 3D image (S130). The characteristic (attribute information) of each object may include at least a shape, a size or a color of each object.

In more detail, the controller 180 may change attribute information relating to a color of each object based on a 3D depth value of each object included in the 3D image. The color attribute information may include at least a color value, a luminance value or a saturation value.

More concretely, the controller 180 may calculate an average 3D depth value of the objects using the 3D depth value of each of the objects included in the 3D image. Afterwards, the controller 180 may change a color of each object based on a difference between the 3D depth value of each object and the average 3D depth value.

For example, in a 3D image which appears to protrude out from the mobile terminal 100 based on the display unit 151, the controller 180 may change attribute information relating to a color of an object, which has a 3D depth value greater than the average 3D depth value, namely, an object viewed within a short range. As such, the corresponding object can have an increased luminance value and saturation value.

Similarly, the controller 180 may change the attribute information relating to a color of an object, which has a 3D depth value smaller than the average 3D depth value, namely, an object viewed at a distance. As such, the corresponding object can have a decreased luminance value and saturation value.

The controller 180 may display the 3D image including the characteristic-changed objects on the display unit 151 (S140). This may allow the objects to be displayed on the display unit 151 according to a change in at least shape, size or color of the objects based on the 3D depth value.

Therefore, as the characteristics of the objects included in the 3D image change, each of the objects may be separately given a three-dimensional effect (stereoscopic space sense), which may provide a user with more realistic content (or contents).

Figure 13A:
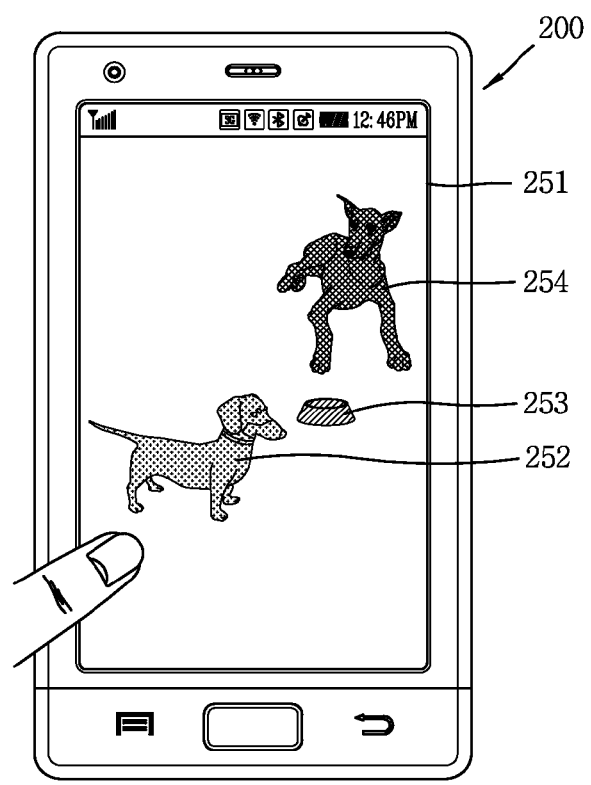
FIGS. 13A, 13B and 13C illustrate changing characteristics of objects included in a 3D image in accordance with the embodiment of FIG. 12.
Figure 13B:
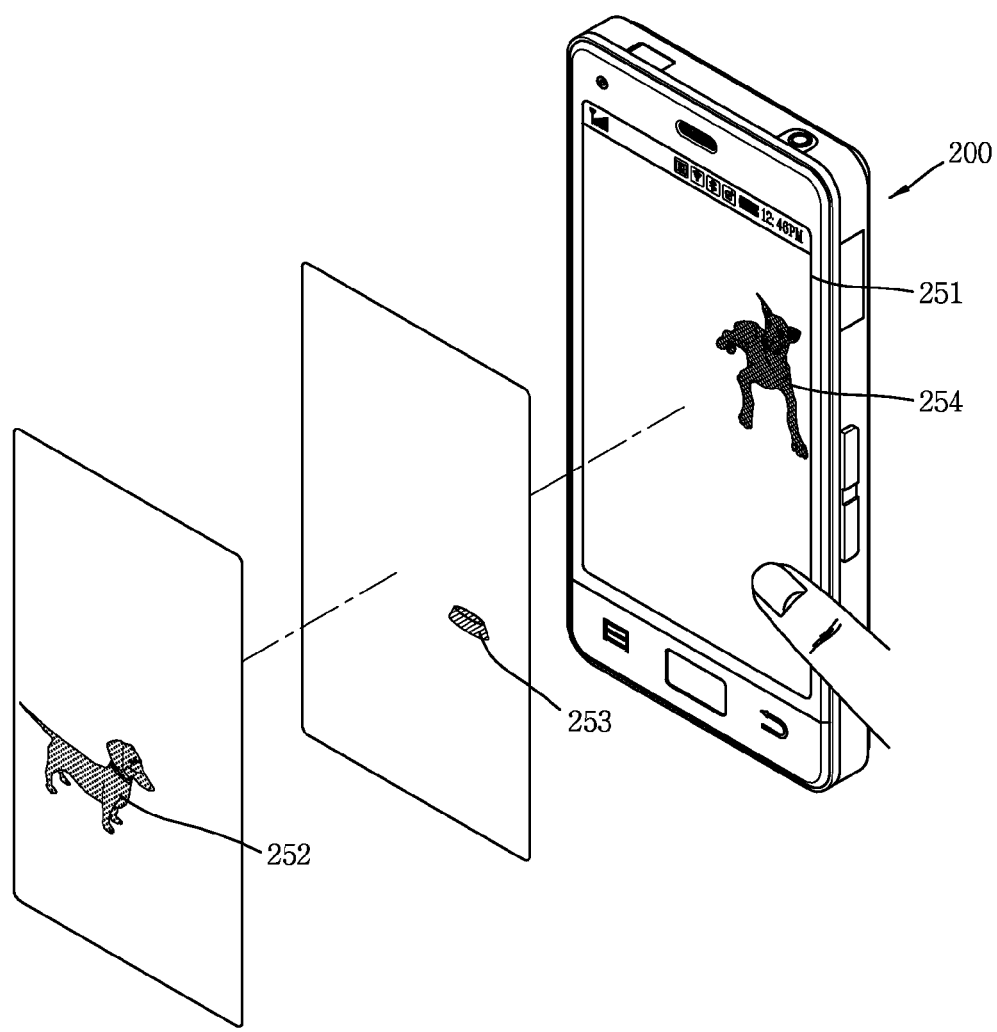
Figure 13C:
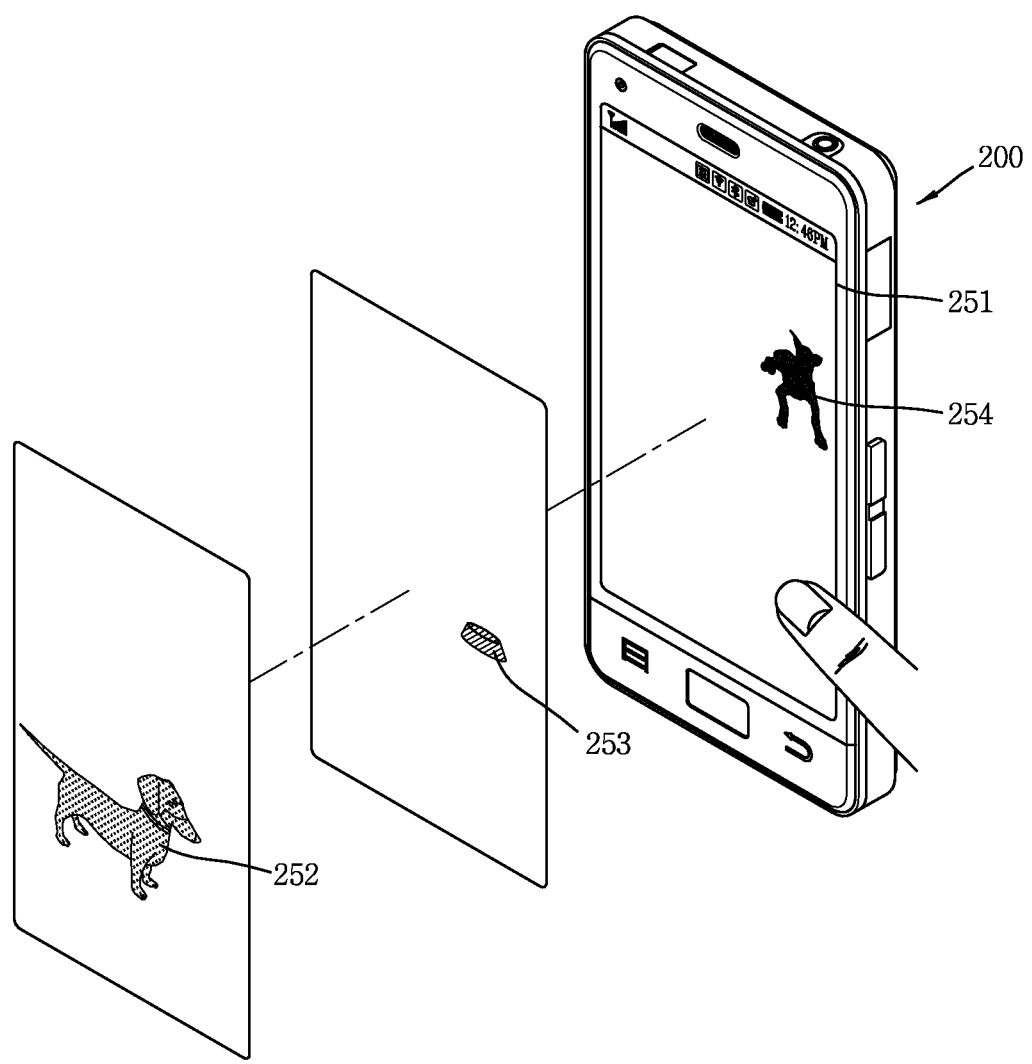

FIGS. 13A, 13B and 13C illustrate changing characteristics of objects included in a 3D image in accordance with the embodiment of FIG. 12.

As illustrated in FIG. 13A, a plurality of objects 252, 253, 254 may be included in a 2D image displayed on a display unit 251. When a touch input applied on the 2D image is sensed, the controller 180 may convert the 2D image to a 3D image based on characteristic information related to each of the objects 252, 253, 254 (see FIG. 13B). That is, the controller 180 may convert the 2D image to the 3D image by making each of the objects 252, 253, 254 to distinctively appear nearer or further away based on size, luminance and saturation of each object.

Also, the controller 180 may change the characteristic of each object 252, 253, 254 based on a 3D depth value of each object included in the 3D image. That is, the controller 180 may change attribute information relating to a color of an object 252, which appears nearer based on the display unit 251, such that the object 252 can have an increased luminance value or saturation value. The controller 180 may also change attribute information relating to a color of an object 254, which appears further away based on the display unit 251, so that the object 254 can have a decreased luminance value or saturation value.

Consequently, the object 252 may be displayed on the display unit 251 by changing its color into a brighter or clearer (more transparent) color, and the object 254 may be displayed on the display unit 251 by changing its color into a darker or thicker (less transparent) color. When attribute information relating to a color of the object 253 is changed by the controller 180, the object 253 may also be displayed on the display unit 251 with its color changed accordingly.

Afterwards, when a touch input applied on the 3D image is sensed again, the controller 180 may convert the 3D image back to the 2D image. Here, the controller 180 may display the 2D image by including the objects 252, 253, 254 whose color attribute information have been changed in the 2D image. Accordingly, unlike the 2D image shown in FIG. 13A, a sharp difference in color brightness or sharpness may be exhibited in the objects 252, 253, 254 included in the 2D image.

FIG. 13C illustrates changing a size of each object based on characteristic information related to each object upon conversion from a 2D image to a 3D image.

As illustrated in FIG. 13C, when a touch input applied on a 2D image including a plurality of objects 252, 253, 254 is sensed, the controller 180 may convert the 2D image to a 3D image based on characteristic information of the objects and may change a size of each object based on a 3D depth value of each object included in the 3D image.

That is, the controller 180 may change characteristic information related to the object 252, which appears nearer, such that the object 252 can have an increased size, and change characteristic information related to the object 254, which appears further away, such that the object 254 can have a reduced size. Hence, the object 252 may be displayed on the display unit 251 with its size increased, and the object 254 may be displayed on the display unit 251 with its size reduced. Also, when the controller 180 changes characteristic information related to the object 253, the object 253 may also be displayed with its size changed.

In addition, the controller 180 may also change a shape of each object 252, 253, 254 based on a 3D depth value thereof.

Figure 14:
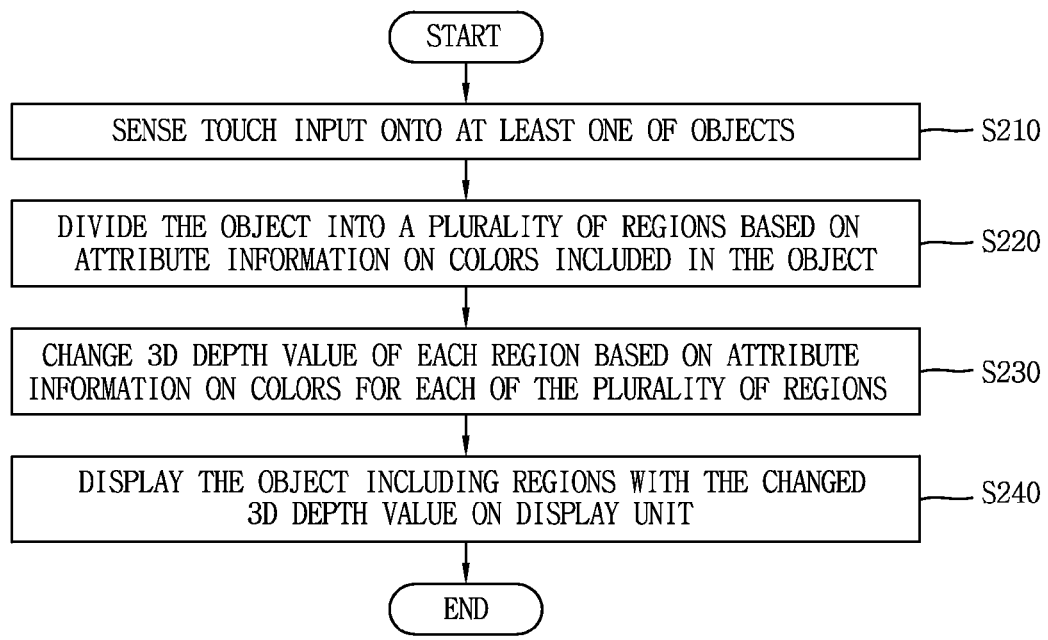
FIG. 14 is a flowchart showing a 3D image control method for a mobile is terminal in accordance with another embodiment.

FIG. 14 is a flowchart illustrating a 3D image control method for a mobile terminal in accordance with one embodiment.

With reference to FIG. 14, when a touch input applied to at least one of the objects displayed on the display unit 151 is sensed (S210), the controller 180 may divide the corresponding object into a plurality of regions (S220).

In more detail, an object may be displayed with a variety of colors. The controller 180 may divide the object into a plurality of regions based on attribute information relating to the colors included in the object. Here, the color attribute information may include at least a color value, a luminance value or a saturation value.

Afterwards, the controller 180 may change a 3D depth value of each region based on the color attribute information related to each of the plurality of regions (S230).

In more detail, the controller 180 may change a 3D depth value of each of a plurality of regions included in one object by allowing the respective regions to distinctively appear nearer or further away based on color, luminance, saturation and the like of each of the plurality of regions.

Therefore, the controller 180 may display the object including the plurality of regions each having the changed 3D depth value on the display unit 151 (S240).

In addition, the controller 180 may adjust 3D depth values of objects based on the number of objects displayed on the display unit 151. That is, in a 3D image which appears to be protruding out from the mobile terminal 100 based on the display unit 151, when many objects are included in the 3D image, the controller 180 may change the 3D depth values of the objects into smaller 3D depth values, such that the objects can appear farther away. Also, when a few (or fewer) objects are included in the 3D image, the controller 180 may change the 3D depth values of the objects into greater 3D depth values, such that the objects can appear closer.

When only some objects included in a 2D image are converted to a 3D form, this may allow the corresponding objects to have greater 3D depth values, as compared with conversion of every object to the 3D form.

As described earlier, according to one embodiment, a 3D depth value of each of a plurality of regions included in one object is changed for display on the display unit 151, which may allow a user to perceive a 3D stereoscopic effect from the one object.

Figure 15A:
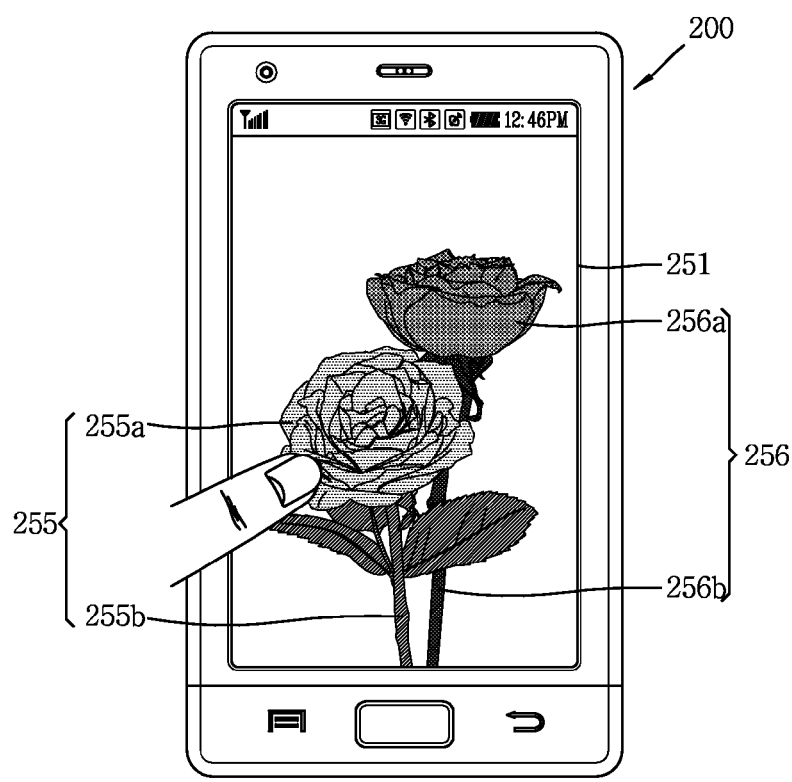
FIGS. 15A and 15B illustrate changing the depth of each object included in a 3D image in accordance with the embodiment of FIG. 14.
Figure 15B:
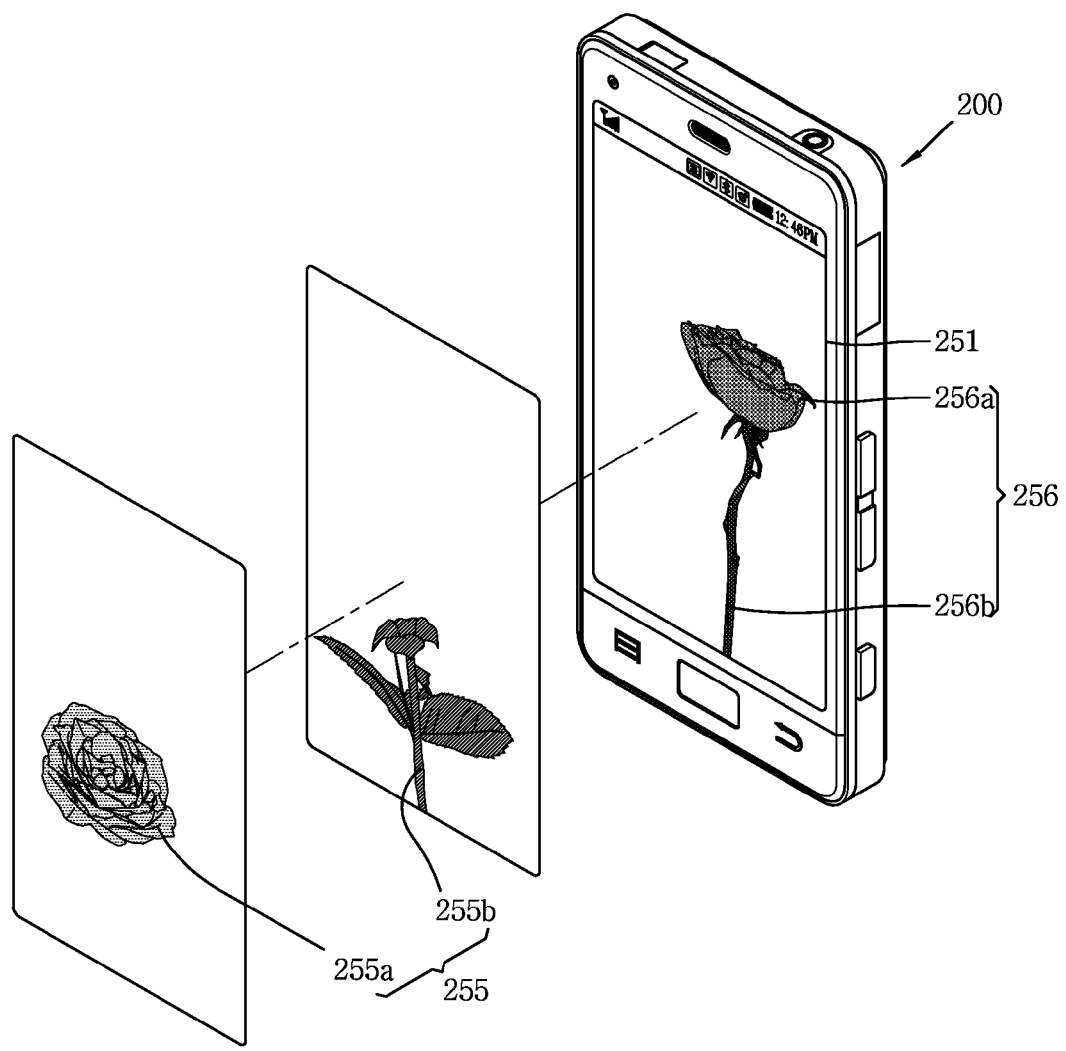

FIGS. 15A and 15B illustrate changing depths of objects included in a 3D image in accordance with the embodiment of FIG. 14.

As illustrated in FIG. 15A, a 2D image displayed on a display unit 251 may include a plurality of objects 255 and 256. When a touch input applied onto the object 255 is sensed, as shown in FIG. 15B, the controller 180 may convert the 2D image into a 3D image based on characteristic information related to the objects 255, 256.

The controller 180 may divide the object 255 into a plurality of regions 255a, 255b based on attribute information relating to colors of the object 255 included in the 3D image. Here, the controller 180 may change a 3D depth value of each of the regions 255a and 255b based on attribute information relating to colors of each region 255a, 255b.

For example, the controller 180 may change a 3D depth value of the region 255a, which has high luminance and saturation so that the region 255a appears closer than the region 255b. Also, the controller 180 may change a 3D depth value of the region 255b, which has low luminance and saturation so that the region 255b appears farther away than the region 255a.

Figure 16:
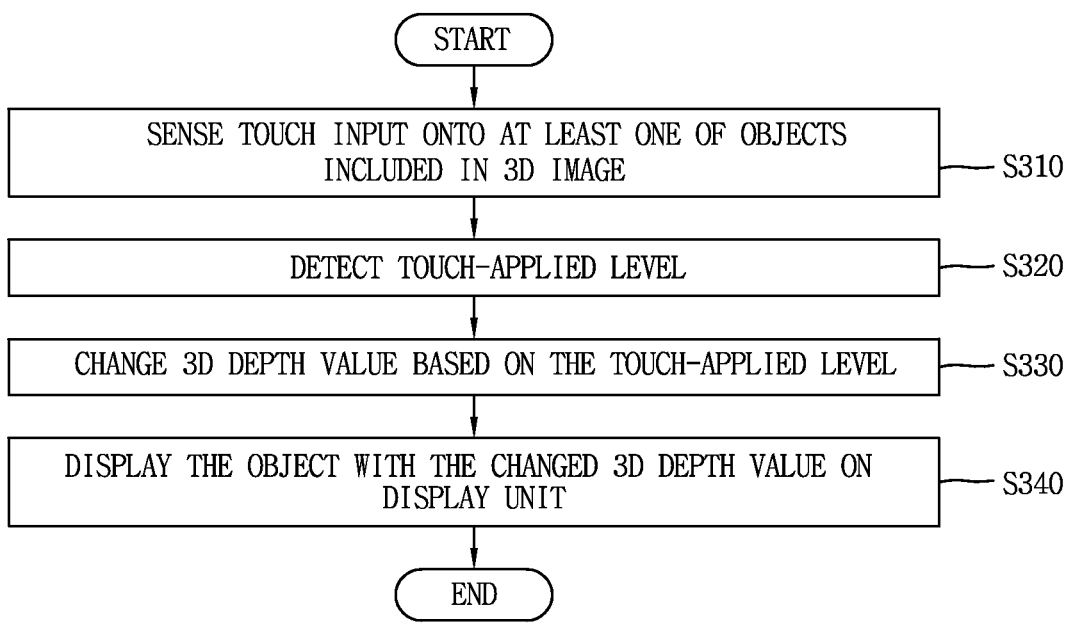
FIG. 16 is a flowchart showing a 3D image control method for a mobile terminal in accordance with another embodiment.

FIG. 16 is a flowchart showing a 3D image control method for a mobile terminal in accordance with one embodiment.

As shown in FIG. 16, when a touch input is applied on at least one object included in a 3D image (S310), the controller 180 may detect a touch-applied level (or touched level) (S320).

In more detail, upon sensing of a touch input applied on at least one object included in a 3D image, the controller 180 may detect a touch-applied level with respect to the object. The controller 180 may determine a touch-applied level by detecting at least a change in a touch operation or a holding time from a start time of the touch input onto the object to a release time from the object.

Here, the touch-applied level may be a touch-lasted time (e.g., duration), the number of touching, a dragged length, and the like. Upon sensing multiple touch inputs, the touch-applied level may be a distance value between first and second touch points.

Afterwards, the controller 180 may change the 3D depth value of the object based on the touch-applied level (S330), and display the object on the display unit (S340).

That is, the controller 180 may calculate a changed 3D depth value based on the touch-applied level, change the 3D depth value of the object based on the calculation result, and display the object with the changed 3D depth value on the display unit 151.

Therefore, according to one embodiment, a 3D depth value of an object included in a 3D image is adjusted based on a touch input, which allows a user to watch or view the 3D image more stereoscopically by adjusting a stereoscopic effect to be suitable for a viewing angle and a watching environment.

FIGS. 17A and 17B and FIGS. 18A and 18B illustrate changing depths of objects included in a 3D image in accordance with the embodiment of FIG. 16.

Figure 17A:
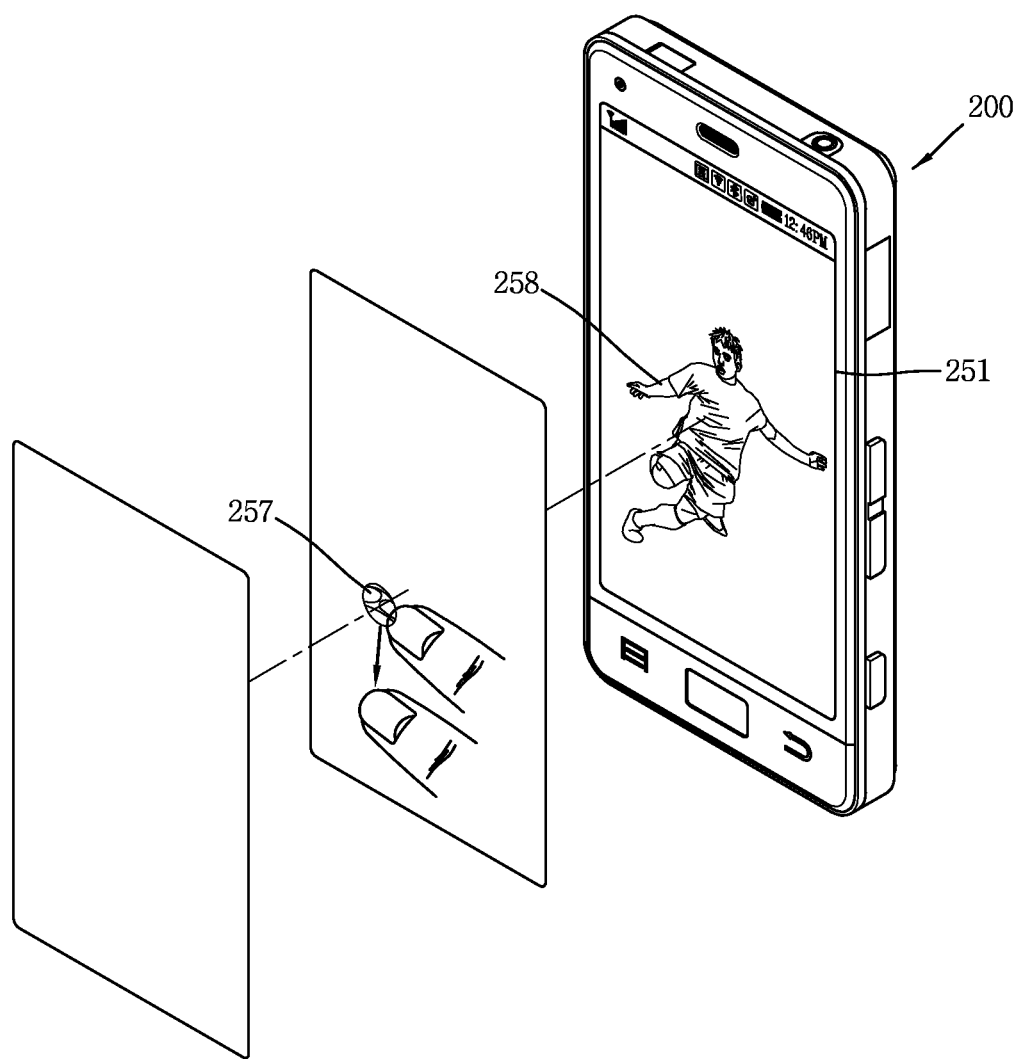
FIGS. 17A, 17B, 18A and 18B illustrate changing the depth of each object included in a 3D image in accordance with the embodiment of FIG. 16.

As shown in FIG. 17A, a 3D image displayed on the display unit 251 may include a plurality of objects 257, 258.

The sensing unit 140 may sense a 2D position of a target to sense, for example, a position of the target to sense on a surface which is parallel with a mobile terminal 200. Also, the sensing unit 140 may sense a 3D position of the target to sense, for example, a position also including a perpendicular distance with respect to the mobile terminal 200. Therefore, the sensing unit 140 may sense a touch input with respect to the object 257, and the controller 180 may execute an operation corresponding to the sensed touch input.

When a user drags the object 257 in a first direction (for example, from top to bottom), the controller 180 may recognize it as a control command for changing a 3D depth value of the object 257.

Although FIG. 17A illustrates that a drag gesture is sensed as the touch input on the first object 257, the type of touch input applied on the first object 257 may not be limited to the drag gesture. For example, when a single tap gesture, a double tap gesture, a flick gesture, a pinch-in or pinch-out gesture or the like is sensed, the controller 180 may also recognize this as a control command for changing the 3D depth value of the first object 257.

Figure 17B:
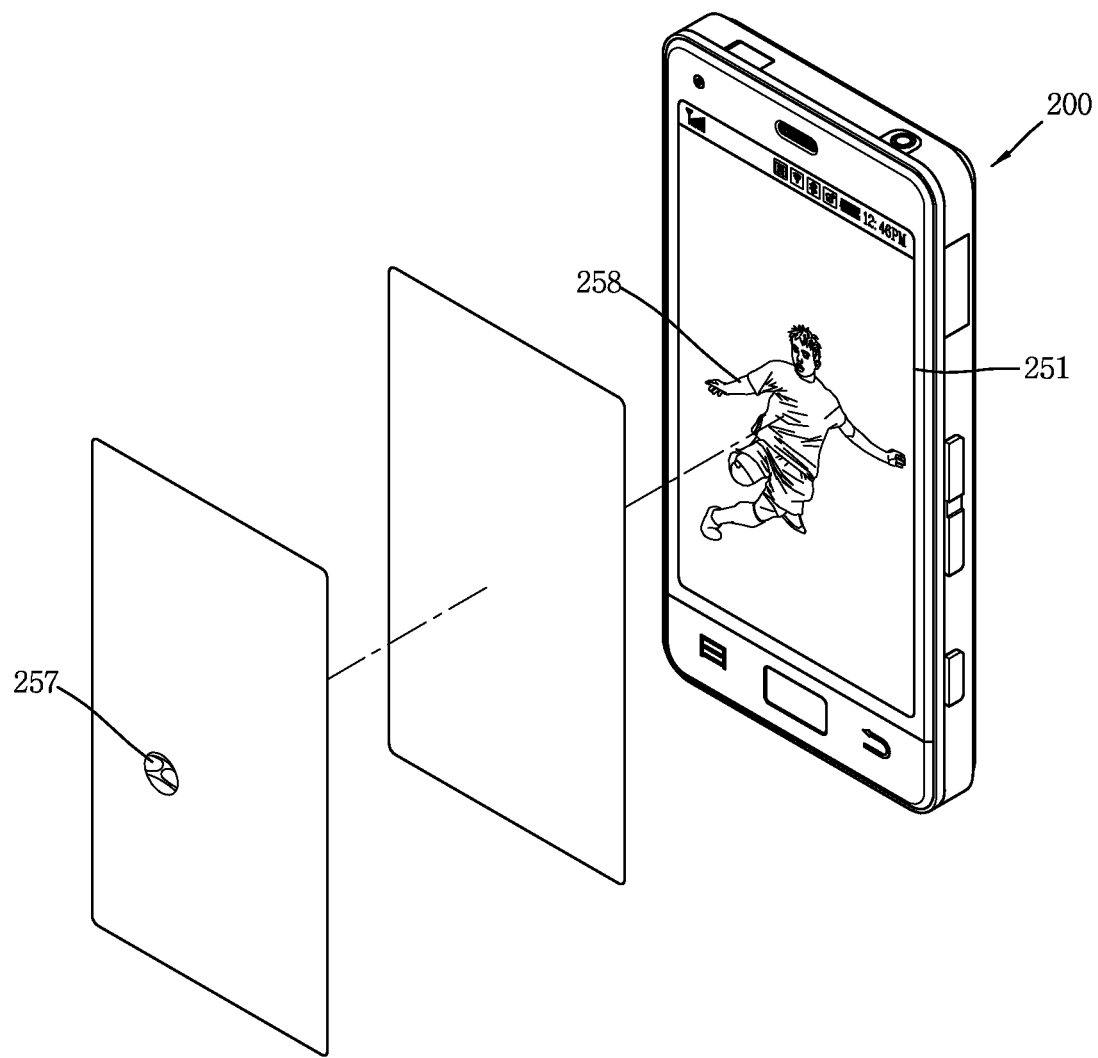

With reference to FIG. 17B, when the control command for changing the 3D depth value of the object 257 is sensed, the controller 180 may change the 3D depth value of the object 257 in response to the corresponding control command. That is, the controller 180 may change the 3D depth value of the object 257 such that the object 257 appears closer.

Figure 18A:
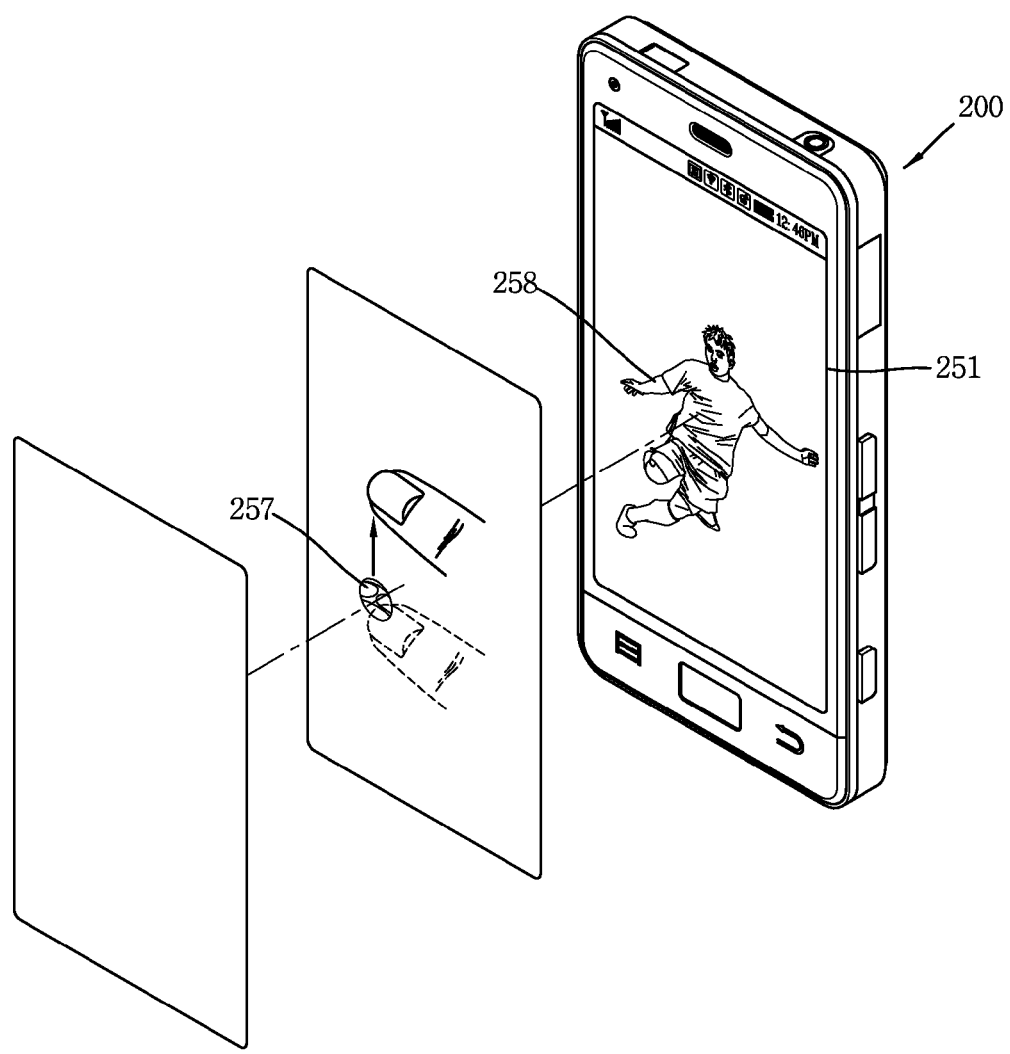
Figure 18B:
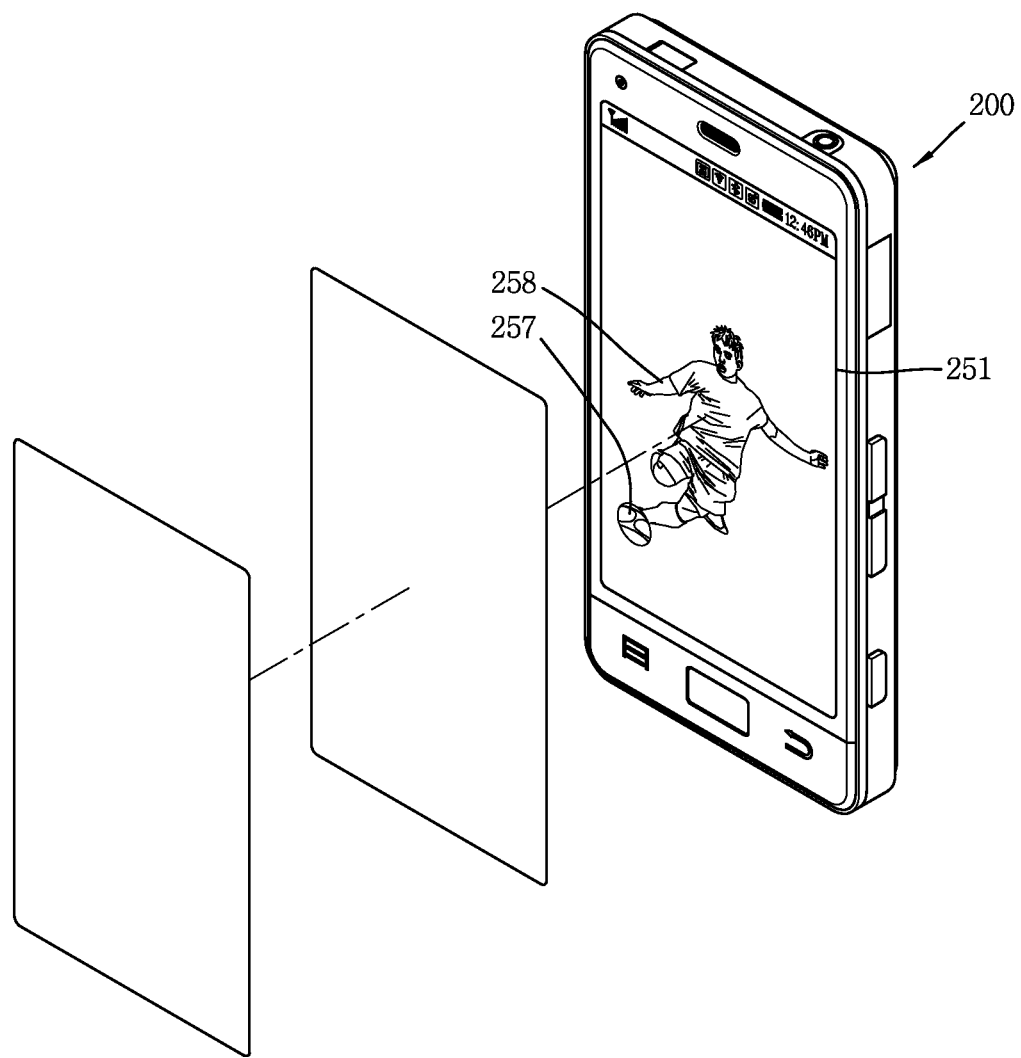

In contrast, as illustrated in FIG. 18A, when the user drags the object 257 in a second direction (for example, from bottom to top), the controller 180 may recognize it as a control command for changing the 3D depth value of the object 257. Afterwards, the controller 180 may change the 3D depth value of the object 257 in response to the control command, as illustrated in FIG. 18B. For example, the controller 180 may change the 3D depth value of the object 257 such that the object 257 appears farther away.

As described with respect to disclosed embodiments, screen brightness and depth of a 3D image may be adjusted in an automatic or selective manner according to ambient brightness of a mobile terminal, thereby improving a user's viewing experience and reducing the user's fatigue.

As also described with respect to disclosed embodiments, a distinctive depth of each object may be provided according to characteristics of objects included in a 3D image, thereby allowing a user to view more realistic contents. In addition, a 3D depth value of an object included in a 3D image may change based on a touch input, thereby allowing the user to view the 3D image more stereoscopically by virtue of an adjustment of a stereoscopic effect suitable for the user's viewing experience and viewing environment.

Further, in accordance with embodiments of the present invention, methods disclosed can be implemented as computer-readable codes in a program-recorded medium. The computer-readable medium may include all types of recording devices storing data readable by a computer system. Examples of such computer-readable media may include ROM, RAM, CD-ROM, magnetic tape, floppy disk, an optical data storage element, and the like. Also, the computer-readable medium may also be implemented as a form of carrier wave (e.g., transmission via the Internet). The computer may include the controller 180 of the mobile terminal.

The configurations of the mobile terminal and methods of controlling the mobile terminal are not limited to disclosed embodiments, but such embodiments may be configured by a selected combination of all or multiple embodiments so as to implement many variations.

As features disclosed may be embodied in several forms without departing from the characteristics (or spirit) of these features, it should also be understood that embodiments of the present invention are not limited by any of the details described herein, unless otherwise specified. Rather, these features should be construed broadly within their scope as defined in the appended claims, and it is intended that all changes and modifications that fall within the metes and bounds of the claims, or equivalents of such metes and bounds, are to be embraced by the appended claims.

What is claimed is:

1. A method for controlling display of an image in a mobile terminal, the method comprising:
 displaying a two-dimensional (2D) image including a plurality of objects;

converting the 2D image to a three-dimensional (3D) image including the plurality of objects in response to a touch input;

measuring an ambient brightness; and automatically adjusting a screen brightness and a depth of the 3D image using control values corresponding to the measured ambient brightness, wherein the automatically adjusting the screen brightness and the depth of the 3D image comprises:

comparing the measured ambient brightness, a depth of each of the plurality of objects and the screen brightness with preset reference values when a 3D mode is a partial 3D mode;

adjusting a brightness of each of the plurality of objects and a brightness of a background based on the measured ambient brightness when the depth of each of the plurality of objects is uniform according to a result of the comparison;

adjusting the brightness and the depth of each of the plurality of objects and the brightness of the background based on the measured ambient brightness when the measured ambient brightness belongs to an average value range; and adjusting the depth of each of the plurality of objects and the brightness of the background based on the measurement ambient brightness when the screen brightness is uniform.

2. The method of claim 1, wherein:

the control values are mapped to the measured ambient brightness in an information table stored in a memory; and the control values comprise values with respect to a screen brightness and a depth of an entire 3D image in a full 3D mode, and values with respect to a screen brightness, a depth and a brightness of a selected 3D object and a background brightness in the partial 3D mode.

3. The method of claim 1, wherein the automatically adjusting the screen brightness and the depth of the 3D image further comprises:

searching an information table for a brightness value and a depth value mapped to the measured ambient brightness; and adjusting the screen brightness and the depth of the 3D image based on the brightness value and the depth value, respectively.

4. The method of claim 1, wherein the automatically adjusting the screen brightness and the depth of the 3D image further comprises:

checking whether the measured ambient brightness belongs to an average value range when the 3D mode is a full 3D mode;

adjusting only the depth of the 3D image based on the control values corresponding to the measured ambient brightness when the measured ambient brightness belongs to the average value range; and adjusting both the screen brightness and the depth of the 3D image based on the control values corresponding to the measured ambient brightness when the measured ambient brightness is outside of the average value range.

5. The method of claim 1, further comprising:

displaying one or more 3D adjustment indicators for adjusting the depth of the 3D image on a screen; and further adjusting the screen brightness and the depth of the 3D image in response to a user input received via the one or more 3D adjustment indicators, wherein at least one of the one or more 3D adjustment indicators is provided on a side surface or a lower portion of the screen, and wherein the screen brightness is automatically set when the depth of the 3D image is adjusted via the one or more 3D adjustment indicators.

6. The method of claim 5, wherein the depth of the 3D image and the screen brightness are adjusted according to a moving distance, a moving direction and a touch count of input received via the one or more 3D adjustment indicators when the depth of the 3D image is adjusted via the one or more 3D adjustment indicators.

7. The method of claim 1, further comprising:

changing a characteristic of each of the plurality of objects included in the 3D image based on a 3D depth value of the object; and displaying the 3D image including each of the plurality of characteristic-changed objects, wherein the characteristic of each of the plurality of objects comprises attribute information relating to at least a shape, a size or color of the object, and wherein the attribute information relating to the color comprises at least color, luminance or saturation.

8. The method of claim 7, wherein the changing the characteristic of each of the plurality of objects comprises:

calculating an average 3D depth value of the plurality of objects included in the 3D image using the 3D depth value of each object; and changing the characteristic of each of the plurality of objects based on a difference between the 3D depth value of the object and the calculated average 3D depth value.

9. The method of claim 1, further comprising:

dividing a specific object of the plurality of objects of the 3D image into a plurality of regions based on attribute information relating to colors included in the specific object when a touch input applied on the specific object is sensed; and changing a 3D depth value of each of the plurality of regions based on the attribute information relating to colors of the region.

10. The method of claim 1, further comprising:

detecting a level of a touch applied on a specific object of the plurality of objects of the 3D image when a touch input applied on the specific object is sensed; and changing a 3D depth value of the specific object according to the detected level, wherein the level comprises a touch holding time, a touch count and a dragged length, and indicates a distance between two touch points when multiple touch inputs are sensed.

11. A mobile terminal comprising:

a display unit configured to display a 2D image including a plurality of images;

a memory configured to store control values corresponding to a characteristic of each of the plurality of objects and ambient brightness values; and a processor, wherein the memory is coupled to the processor to store instructions that, when executed by the processor, cause the processor to perform operations comprising:

sensing an ambient brightness or a touch input;

converting the 2D image to a three-dimensional (3D) image including the plurality of objects in response to the touch input;

searching the memory for control values corresponding to the sensed ambient brightness; and automatically adjusting a screen brightness and a depth of the 3D image using the control values corresponding to the sensed ambient brightness, wherein the automatically adjusting the screen brightness and the depth of the 3D image comprises:

comparing the measured ambient brightness, a depth of each of the plurality of objects and the screen brightness with preset reference values when a 3D mode is a partial 3D mode;

adjusting a brightness of each of the plurality of objects and a brightness of a background based on the measured ambient brightness when the depth of each of the plurality of objects is uniform according to a result of the comparison;

adjusting the brightness and the depth of each of the plurality of objects and the brightness of the background based on the measured ambient brightness when the measured ambient brightness belongs to an average value range; and adjusting the depth of each of the plurality of objects and the brightness of the background based on the measurement ambient brightness when the screen brightness is uniform.

12. The mobile terminal of claim 11, wherein:

the control values corresponding to the sensed ambient brightness are mapped to the sensed ambient brightness in an information table stored in the memory; and the control values comprise values with respect to a screen brightness and a depth of an entire 3D image in a full 3D mode, and values with respect to a screen brightness, a depth and a brightness of a selected 3D object and a brightness of a background in the partial 3D mode.

13. The mobile terminal of claim 11, wherein:

the control values corresponding to the sensed ambient brightness are mapped to the sensed ambient brightness in an information table; and the ambient brightness or the touch input is sensed via an optical sensor or a touch sensor.

14. The mobile terminal of claim 11, wherein the processor is further configured to:

check whether or not the sensed ambient brightness belongs to an average value range when a 3D mode is a full 3D mode;

adjust only the depth of the 3D image when the sensed ambient brightness belongs to the average value range; and adjust both the screen brightness and the depth of the 3D image based on the control values corresponding to the sensed ambient brightness when the sensed ambient brightness is outside of the average value range.

15. The mobile terminal of claim 11, wherein the processor is further configured to:

cause the display unit to display a depth-adjusted level using a 3D adjustment indicator when the screen brightness and the depth of the 3D image are automatically adjusted; and further adjust the depth of the 3D image and the screen brightness in response to a user input received via the 3D adjustment indicator.

16. The mobile terminal of claim 15, wherein the processor is further configured to automatically set an optimal screen brightness or set the depth of the 3D image and the screen brightness according to a moving distance, a moving direction and a touch count of the user input received via the 3D adjustment indicator when the depth of the 3D image is adjusted via the 3D adjustment indicator.

17. The mobile terminal of claim 11, wherein the processor is further configured to:

change the characteristic of each of the plurality of objects in the 3D image based on a 3D depth value of the object; and cause the display unit to display the 3D image including each of the plurality of characteristic-changed objects on the display unit.

18. The mobile terminal of claim 17, wherein the processor is further configured to:

calculate an average 3D depth value based on the 3D depth value of each of the plurality of objects; and change the characteristic of each of the plurality of objects based on a difference between the 3D depth value of the object and the calculated average depth value.

19. The mobile terminal of claim 17, wherein:

the characteristic of each of the plurality of objects comprises attribute information relating to at least a shape, a size or colors of each object; and the attribute information relating to the colors comprises at least color, luminance or saturation.

20. The mobile terminal of claim 11, wherein the processor is further configured to:

divide each of the plurality of objects into a plurality of regions based on attribute information relating to colors of the object; and change a 3D depth value of each of the plurality of regions based on attribute information relating to colors of the region.

21. The mobile terminal of claim 11, wherein the processor is further configured to:

change a 3D depth value of a specific object of the plurality of objects based on a level of a touch applied to the specific object when a touch input applied to the specific object is sensed, wherein the level of the touch comprises a touch holding time, a touch count and a dragged length, and indicates a distance between two touch points when multiple touch inputs are sensed.

* * * * *